(12) United States Patent
Chen

(10) Patent No.: US 9,426,709 B2
(45) Date of Patent: Aug. 23, 2016

(54) METHOD OF HANDLING ANCHOR-BASED MOBILITY MANAGEMENT

(71) Applicant: Industrial Technology Research Institute, Hsinchu (TW)

(72) Inventor: Hung-Chen Chen, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 43 days.

(21) Appl. No.: 14/454,692

(22) Filed: Aug. 7, 2014

(65) Prior Publication Data
US 2015/0045088 A1    Feb. 12, 2015

Related U.S. Application Data

(60) Provisional application No. 61/863,880, filed on Aug. 8, 2013.

(51) Int. Cl.
| | |
|---|---|
| *H04B 7/00* | (2006.01) |
| *H04W 36/10* | (2009.01) |
| *H04W 48/20* | (2009.01) |
| *H04W 92/12* | (2009.01) |
| *H04W 76/04* | (2009.01) |
| *H04W 84/04* | (2009.01) |
| *H04W 92/04* | (2009.01) |

(52) U.S. Cl.
CPC ............. *H04W 36/10* (2013.01); *H04W 48/20* (2013.01); *H04W 76/04* (2013.01); *H04W 84/045* (2013.01); *H04W 92/045* (2013.01); *H04W 92/12* (2013.01)

(58) Field of Classification Search
USPC .............................. 455/432.1–442, 456.1, 424
See application file for complete search history.

(56) References Cited

U.S. PATENT DOCUMENTS

| | | | | |
|---|---|---|---|---|
| 2007/0110015 | A1* | 5/2007 | Chakraborty | H04B 7/022 370/338 |
| 2008/0031159 | A1 | 2/2008 | Jokinen | |
| 2012/0289232 | A1* | 11/2012 | Ostrup | H04W 76/068 455/436 |
| 2015/0312828 | A1* | 10/2015 | Serravalle | H04B 7/155 455/438 |
| 2015/0334636 | A1* | 11/2015 | Maeda | H04W 4/08 370/252 |
| 2016/0014659 | A1* | 1/2016 | Perras | H04L 61/1511 370/389 |

FOREIGN PATENT DOCUMENTS

| | | |
|---|---|---|
| CN | 101473678 A | 7/2009 |
| EP | 2 262 316 A1 | 12/2010 |
| EP | 2 458 917 A1 | 5/2012 |
| WO | 2009050231 A2 | 4/2009 |

(Continued)

OTHER PUBLICATIONS

Mediatek Inc., Frequent handover for small cell deployment, 3GPP TSG-RAN2 #81bis Meeting, Apr. 15-19, 2013, R2-131454, XP050699567, Chicago, USA.

(Continued)

*Primary Examiner* — Fayyaz Alam
(74) *Attorney, Agent, or Firm* — Winston Hsu; Scott Margo

(57) ABSTRACT

A method of handling anchor-based mobility management in a communication system includes determining whether to establish an interface to a network entity at an anchor base station for a user equipment (UE); selecting at least one anchor base station for establishing the interface; and requesting the at least one anchor base station to establish the interface for the UE by an access base station of the UE.

28 Claims, 39 Drawing Sheets

(56) References Cited

FOREIGN PATENT DOCUMENTS

| WO | WO2009050231 A2 * | 4/2009 |
| WO | 2011083947 A2 | 7/2011 |

OTHER PUBLICATIONS

New Postcom, Existing open issues in enhanced mobility between HeNB and MeNB, 3GPP TSG RAN WG3 Meeting #72, May 9-13, 2011, pp. 1-5, R3-111257, XP050498183, Barcelona, Spain.

CATT, Necessity of the flow control mechanism over Xn, 3GPP TSG RAN WG2 Meeting #83, Aug. 19-Aug. 23, 2013, pp. 1-3, R2-132483, XP050718187, Barcelona, Spain.

CMCC, "Discussion on architecture design for small cell enhancements", 3GPP TSG RAN WG2#82 Meeting, May 20-24, 2013, R2-131943, XP050699948, Fukuoka, Japan.

Nokia Corporation et al., "Mobility enhancement for non-CA capable UE", 3GPP TSG-RAN WG2 Meeting #82, May 20-May 24, 2013, R2-131906, XP050700083, Fukuoka, Japan.

Intel Corporation, "Virtual anchor cell to reduce signalling load", 3GPP TSG RAN WG2 Meeting #82, May 20-25, 2013, R2-131991, XP050700116, Fukuoka, Japan.

ITRI, "Anchor-Based Mechanism for Reducing S1 Signalling Load", 3GPP TSG-RAN WG2 Meeting#83, Aug. 19-23, 2013, pp. 1-3, R2-132354, XP050718127, Barcelona, Spain.

* cited by examiner

METHOD OF HANDLING ANCHOR-BASED MOBILITY MANAGEMENT

CROSS REFERENCE TO RELATED APPLICATIONS

This application claims the benefit of U.S. Provisional Application No. 61/863,880, filed on Aug. 8, 2013 and entitled "Anchor-based Mechanism for Mobility Management", the contents of which are incorporated herein in their entirety.

BACKGROUND OF THE INVENTION

1. Field of the Invention

The present invention relates to a method used in a wireless communication system and related communication device, and more particularly, to a method of handling anchor-based mobility management and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmission/reception, UL multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Please refer to FIG. 1, which shows a schematic diagram of a conventional communication system 10. As shown in FIG. 1, a UE may experience more frequent handovers in small cell deployments compared to homogeneous network deployments. Due to mobility management, frequent handovers would result in large overhead in control signalling (i.e., the messages of Path Switch Request and Path Switch Request Ack) to the core network. For example, if the UE quickly moves around and passes through multiple small cells, the UE may experience more handovers in the small cell environment. To solve this issue, the communication system may employ anchor-based mobility management to reduce the control signalling sent to the core network. However, the anchor base station may suffer heavy load or the anchor base station may be crashed unexpectedly in certain situations. In such situations, the system performance is significantly decreased due to the anchor-based mobility management.

Thus, how to handle the anchor-based mobility management to overcome the tradeoff problem between reducing core-network control signaling, increasing load of anchor eNB, and increasing additional inter-eNB signaling is an important topic to be addressed.

SUMMARY OF THE INVENTION

An objective of the present invention is to provide an anchor-based mobility management mechanism so that the access eNB could decide which eNB (a selected anchor eNB or the access eNB itself) is suitable for establishing the S1-MME interface for a UE to overcome the tradeoff problem.

The present invention discloses a method of handling anchor-based mobility management in a communication system includes determining whether to establish an interface to a network entity at an anchor base station for a user equipment (UE); selecting at least one anchor base station for establishing the interface; and requesting the at least one anchor base station to establish the interface for the UE by an access base station of the UE.

The present invention further discloses a method of handling anchor-based mobility management for an anchor base station in a communication system. The method includes triggering a prohibit procedure when a load of the anchor base station or a cost of being the anchor base station of an access base station is over a pre-defined threshold; calculating a score of each access base station associated with the anchor base station based on mobility statistics; selecting one or more victim access base stations according to the score or the mobility statistics of each access base station; and prohibiting the one or more victim access base stations from sending an anchor activation request, wherein the anchor activation request is used for requesting the anchor base station to establish an interface to an network entity for a UE.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
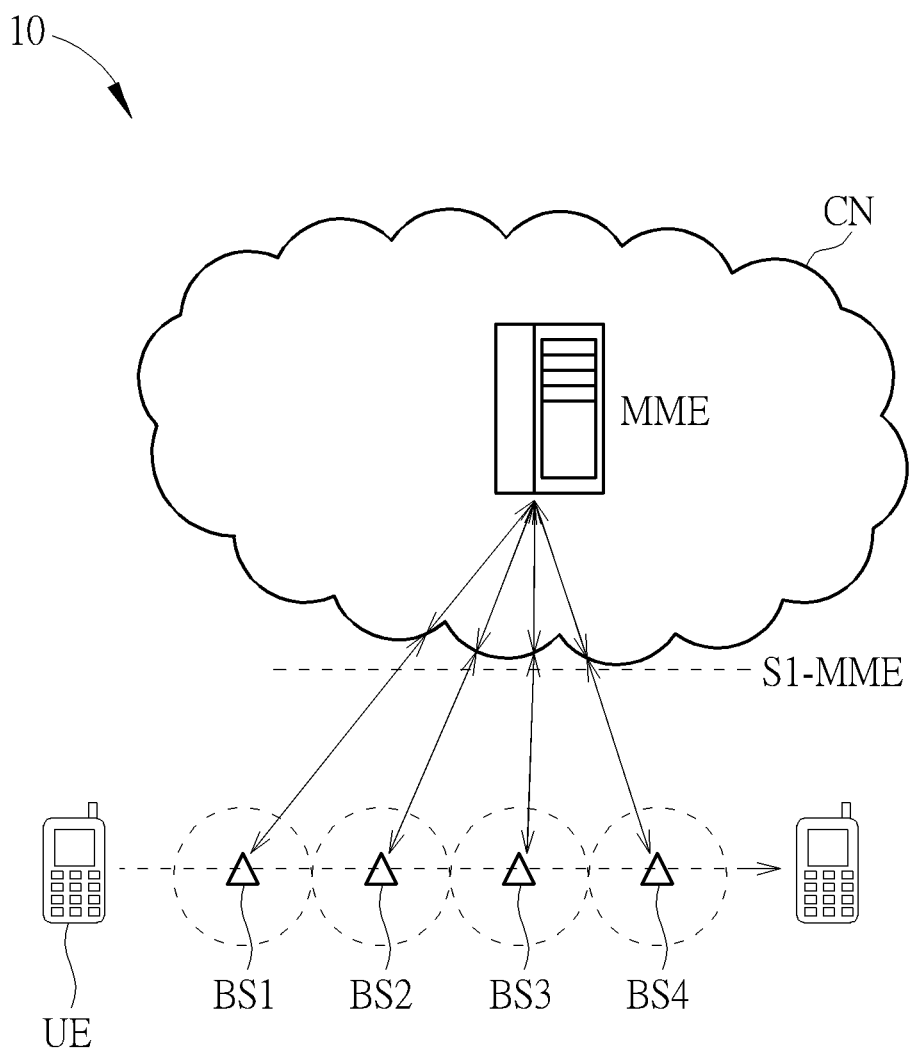
FIG. 1 is a schematic diagram of a conventional communication system.
Figure 2:
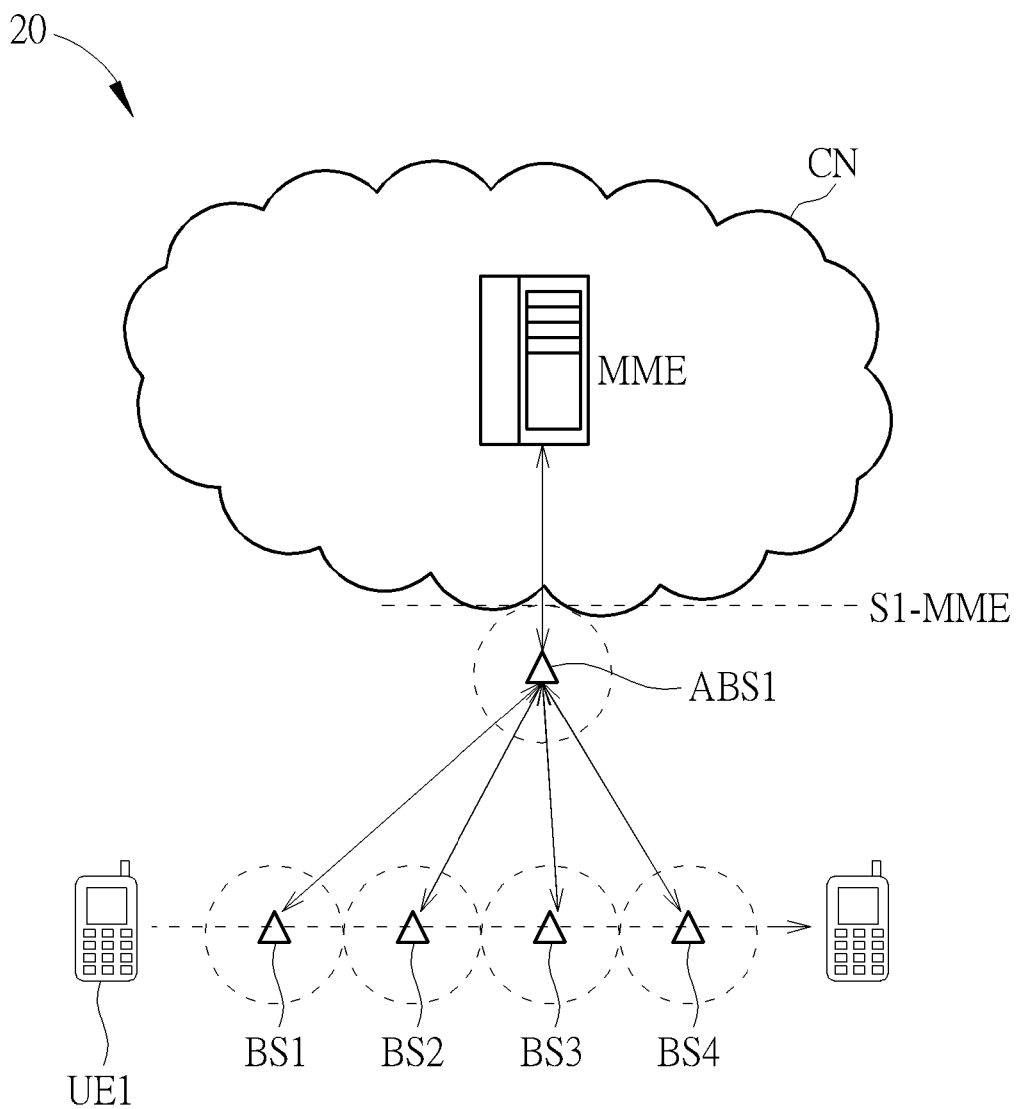
FIG. 2 is a schematic diagram of a wireless communication system according to an example of anchor-based mobility management.

Please refer to FIG. 2, which is a schematic diagram of a wireless communication system 20 according to an example of anchor-based mobility management. The wireless communication system 20 is briefly composed of a mobile device UE1 and a network including an anchor base station ABS1, access base stations BS1-BS4 affiliated with the anchor base station ABS1, and a core network containing a Mobility Management Entity (MME). In FIG. 2, the network and the mobile device UE1 are simply utilized for illustrating the structure of the wireless communication system 20. Practically, the network may be a universal terrestrial radio access network (UTRAN) comprising a plurality of Node-Bs (NBs) in a universal mobile telecommunications system (UMTS), and the base stations BS1-BS4 may stand for the plurality of Node-Bs. In another example, the network may be an evolved UTRAN (E-UTRAN) comprising a plurality of evolved NBs (eNBs) in a long term evolution (LTE) system, a LTE-Advanced (LTE-A) system or an evolution of the LTE-A system, and the base stations BS1-BS4 may stand for the plurality of eNBs. The anchor base station ABS1 may be a base station dedicated for serving as an anchor base station, or a functional entity attached to a regular eNB.

Furthermore, the network may also include both the UTRAN/E-UTRAN and a core network, wherein the core network includes network entities such as the MME, Serving Gateway (S-GW), Packet Data Network (PDN) Gateway (P-GW), Self-Organizing Networks (SON) server and/or Radio Network Controller (RNC), etc. In other words, after the network receives information transmitted by a mobile device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information may be processed by both the UTRAN/E-UTRAN and the core network, and the decisions are made after coordination and/or cooperation are performed by the UTRAN/E-UTRAN and the core network. The mobile device may be a user equipment (UE), a low cost device (e.g., machine type communication (MTC) device), a mobile phone, a laptop, a tablet computer, an electronic book or a portable computer system. Besides, the network and the mobile device may be seen as a transmitter or a receiver according to direction, e.g., for an uplink (UL) transmission, the mobile device is the transmitter and the network is the receiver, and for a downlink (DL) transmission, the network is the transmitter and the mobile device is the receiver.

Figure 3:
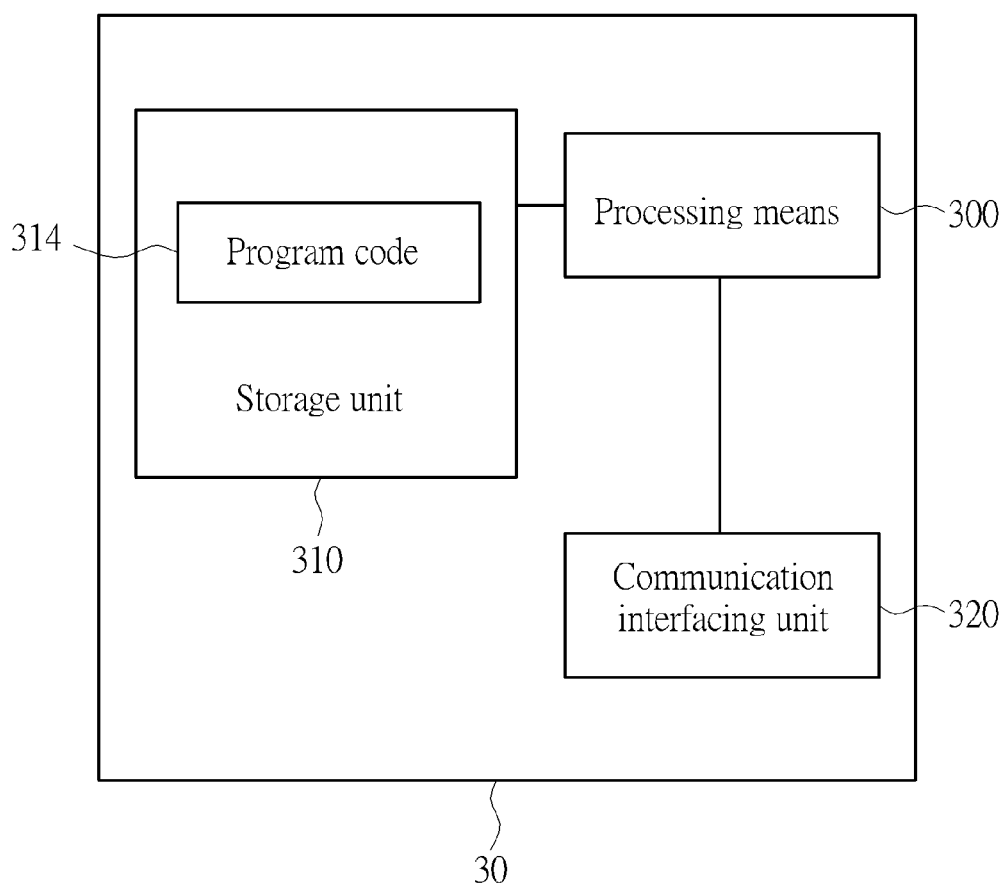
FIG. 3 is a schematic diagram of a communication device according to an example of the present invention.

Please refer to FIG. 3, which is a schematic diagram of a communication device 30 according to an example of the present invention. The communication device 30 may be a mobile device or a base station of the network shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that can store a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
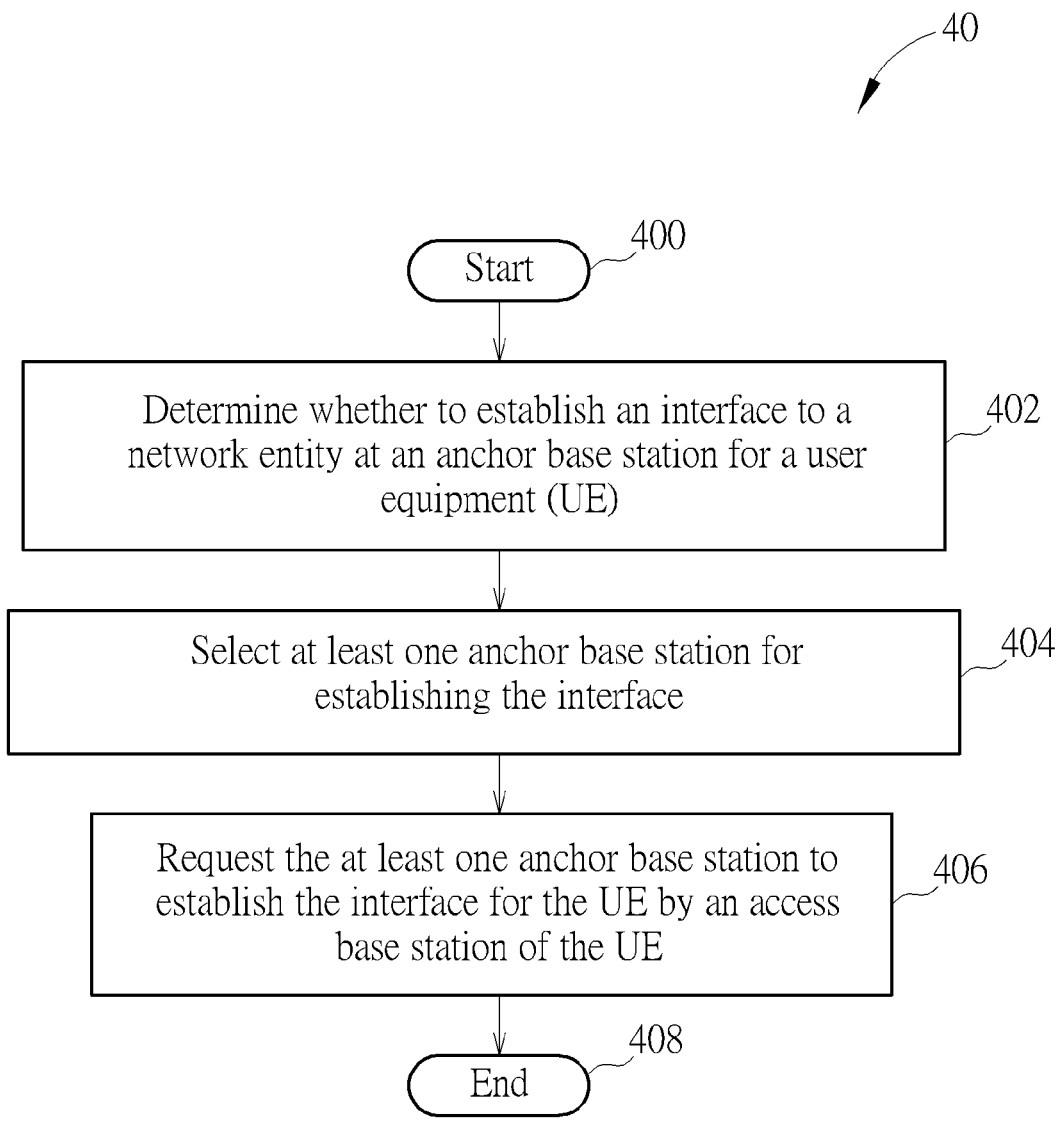
FIG. 4 is a flowchart of a process according to an example of the present invention.

Please refer to FIG. 4, which is a flowchart of a process 40 according to an example of the present invention. The process 40 can be utilized in a base station shown in FIG. 2 for handling anchor-based mobility management in a communication system. The process 40 may be compiled into the program code 314 and includes the following steps:

Step 400: Start.

Step 402: Determine whether to establish an interface to a network entity at an anchor base station for a user equipment (UE).

Step 404: Select at least one anchor base station for establishing the interface.

Step 406: Request the at least one anchor base station to establish the interface for the UE by an access base station of the UE.

Step 408: End.

According to the process 40, the access base station (e.g., an access eNB) may use UE-related information to decide whether to establish an S1 interface between the MME and an anchor eNB for the UE (Step 402, which may be referred to as an anchor necessity decision procedure). The access base station is a serving base station to which the UE is going to connect when the UE is transiting from an IDLE mode to a Connected mode, or a target eNB of the UE in a handover procedure. The access base station may be a small eNB such as a pico eNB, a micro eNB, or a macro eNB. The UE-related information may include mobility information, traffic information, and/or UE requirement information. The mobility information is used for frequent handover prediction or moving direction prediction, the traffic information is used for connection remaining time prediction, and the UE requirement information is used for understanding the UE's capability or the classification of the subscriber. Examples of the mobility information include, but are not limited to, an average time of stay (TOS) in a cell (e.g., average TOS in small cells or all cells), and a mobility state (e.g., normal, medium, or high). Examples of the traffic information include, but are not limited to, the number of transitions (from an IDLE mode to a Connected mode, from a Connected mode to an IDLE mode, or both) in a pre-defined period, and a traffic type (e.g., a background traffic type, a streaming traffic type, etc.). Examples of the UE requirement information include, but are not limited to, an elapsed time tolerance and a delay tolerance. The UE-related information may be collected directly from the UE or may be derived from historical statistics of one or more UEs which have been connected to the access base station.

After the access eNB has determined to establish the S1-MME interface at an anchor base station (or an anchor eNB) for the UE, the access eNB may use an anchor section algorithm to determine which anchor base station should be selected as the anchor base station for establishing the S1-MME interface (Step 404, which may be referred to as an anchor selection procedure). The anchor selection algorithm is used to calculate a score of each candidate anchor base station based on anchor-related network information and/or UE-related information. The anchor-related network information may be received from candidate anchor base stations or neighboring base stations periodically or upon a triggering event. That is, the access eNB may ask for the anchor-related network information from candidate anchor base stations directly, or the access eNB may ask for the anchor-related network information from neighboring base stations indirectly. The access eNB may score all reachable anchor eNB(s) or score the anchor eNB(s) introduced by its neighboring eNB(s) in anchor-related network information provided by its neighboring eNB(s). Then, an anchor base station with score higher than a pre-defined threshold or with the highest ranking in score may be selected as the selected anchor base station for performing the Step 406, which may be referred to as an anchor activation procedure.

The anchor-related network information may include an anchor identity, load information, and/or anchor constraints for the mobility information, the traffic information or the UE requirement information. The UE-related information may be collected directly from the UE or may be derived from historical statistics of one or more UEs which have been connected to the access base station as mentioned in the above. Similar to the UE-related information used in Step 402, the UE-related information used in Step 404 may also include mobility information, traffic information, and/or UE requirement information. Examples of the mobility information include, but are not limited to, an average TOS in a cell, a mobility state, and a moving trajectory (i.e., last camped cell(s)). Examples of the traffic information include, but are not limited to, the number of transitions in a pre-defined period, and a traffic type. Examples of the UE requirement information include, but are not limited to, an elapsed time tolerance and a delay tolerance.

Since UEs may have different behaviors or characteristics and the network condition of an anchor eNB could be changed dynamically, it is not beneficial for an access eNB to ask the same anchor eNB to establish and keep the same S1-MME interface for all the UEs. For example, if a UE moves slowly, the probability of experiencing frequent handovers may become lower and the load of the anchor eNB could be increased accordingly. If a UE will transit to an IDLE mode soon, the cost of establishing the S1-MME interface at an anchor eNB may be higher than the saving of control signalling towards core network (CN). Moreover, if the load of an anchor eNB is too heavy, the access eNB may have to select another anchor eNB to establish the S1-MME interface for the UE. In the present invention, the access eNB may determine whether to establish the S1-MME interface at an anchor eNB according to the UE-related information, and determine which anchor eNB(s) should be selected by using the anchor selection algorithm. The access eNB then requests the selected anchor eNB(s) for establishing the S1-MME interface. Thus, the present invention may provide preferable performance for the communication system which saves control signalling towards core network and keeps a moderate load of the anchor eNB as well as acceptable additional inter-eNB signalling while using the anchor eNB to establish the S1-MME interface for a UE.

Note that the process 40 is an example of the present invention. Those skilled in the art can make modifications and/or alterations accordingly. For example, the process 40 may be performed by other entities in the network, not limited to the access eNB. In some examples, the UE-related information may be collected directly from the UE, which is called "UE assistant information". In other examples, the UE-related information may be derived from historical statistics of one or more UEs which have been connected to the serving base station, called as "historical UE behavior statistics", because certain legacy UEs may be unable to provide the UE-related information for establishing the S1-MME interface. In such situations, the access base station may calculate the average TOS of all UEs (which have been connected to the serving base station) in a pre-defined period to represent the average TOS in a cell for the mobility information. Similarly, the access base station may use the average mobility state of all UEs in a pre-defined period to represent the mobility state for the mobility information; derive a general moving trajectory from, for example, the most common last camped cell(s) for all UEs in a pre-defined period to be the moving trajectory for the mobility information; calculate the average number of transitions of all UEs in a pre-defined period to represent the number of transitions for the traffic information; use the most common traffic type of all UEs in a pre-defined period to represent the traffic type for the traffic information; and calculate the average elapsed time tolerance or the average delay tolerance of all UEs in a pre-defined period to represent the elapsed time tolerance or the delay tolerance for the UE requirement information.

For a UE with shorter average TOS, establishing an S1-MME interface at an anchor eNB for the UE may be beneficial since the UE may have frequent handovers in the future. Therefore, if the average TOS is below a pre-defined threshold, the access eNB may decide to establish the S1-MME interface at an anchor eNB for the UE.

For a UE with low mobility state, establishing an S1-MME interface at an anchor eNB for the UE may not be beneficial since the handover possibility may be low and load of anchor eNB could be increased accordingly. Therefore, if the mobility state is below a pre-defined level, the access eNB may decide to establish the S1-MME interface at the access eNB itself for the UE.

For a UE with larger number of transitions, establishing an S1-MME interface at an anchor eNB for the UE may not be beneficial since the handover possibility may be low. Therefore, if the number of transitions is above a pre-defined threshold, the access eNB may decide to establish the S1-MME interface at the access eNB itself for the UE.

For a UE with only background traffic, keeping an S1-MME interface at an anchor eNB for the UE may be beneficial since the UE may stay in the Connected mode with only light traffic load. Background traffic refers to the autonomous exchange of user plane data packets between the UE and the network, generally in the absence of a specific user interaction with the device. The number of packets often increases due to opening applications (or processing the remaining data in the device memory), which requires communication on a regular or intermittent basis with peer entities within the network. Therefore, if a UE has only background traffic, the access eNB may decide to establish the S1-MME interface at an anchor eNB for the UE.

For a UE with only tighter elapsed time tolerance or delay tolerance, establishing an S1-MME interface at an anchor eNB for the UE may not be beneficial because there may be non-ideal backhaul between the anchor eNB and the access eNB, and may result in higher latency, which may not fulfill the UE's requirement. Therefore, if the elapsed time tolerance or delay tolerance is below a pre-defined threshold, the access eNB may decide to establish the S1-MME interface at the access eNB itself for the UE.

The access eNB may trigger the procedure of gathering the anchor-related network information periodically or when some events happened. Then, the access eNB may send anchor information request message(s) to one or more candidate anchor eNBs or neighboring eNBs. Upon receiving the anchor information request message(s), the candidate anchor eNB(s) or the neighboring eNB(s) may send the anchor-related network information in response. Therefore, the access eNB may determine which anchor eNB(s) should be selected according to the received anchor-related network information from the candidate anchor base stations.

For an access eNB, there could be more than one candidate anchor eNB that could be selected to perform the anchor activation procedure. The access eNB may calculate a score for each candidate anchor eNB based on the available information, including historical UE behavior statistics, UE assistant information, and/or anchor-related network information. If only historical UE behavior statistics and anchor-related network information are available, an anchor eNB with lower anchor load and looser anchor constraints (compared to the corresponding historical UE behavior statistics) may have higher score. If UE assistant information and anchor-related network information are available, an anchor eNB with lower anchor load and looser anchor constraints (compared to the corresponding UE assistant information) may have higher score. If UE assistant information includes the moving trajectory, an anchor eNB that the UE may move towards may have higher score. If the access eNB also records mobility related statistics, which may be the number of handovers between the access eNB and its neighboring eNB, the anchor-related network information provided by the neighboring eNB(s) with higher handover possibility may have higher weight. For example, if an access eNB C1 can reach anchor eNBs A1 and A2 and on average a UE in the access eNB C1 has 70% chance of being handed over to an access eNB C2 and 30% chance to be handed over to an access eNB C3, the access eNB C2 can only reach the anchor eNB A1 and the access eNB C3 can only reach the anchor eNB A2, then the anchor eNB A1 may have higher score than the anchor eNB A2 in view of the access eNB C1.

Moreover, the access eNB may request the selected anchor eNB(s) to establish the S1-MME interface for the UE (based on the results of the anchor selection procedure) one by one or simultaneously. The embodiments of the present invention are explained in more detail hereinafter.

The following descriptions and FIGS. 5-18 describe examples when the anchor-based mobility management mechanism is activated without UE assistant information while the UE is transiting from an IDLE mode to a Connected mode.

In an example, the historical UE behavior statistics show that the average TOS in an access eNB C1 is 20 sec, and an anchor eNB A1 with an anchor load of 60% has an anchor constraint of 30 sec for the average TOS. Since the historical UE behavior statistics of the access eNB C1 is below the anchor constraint of the anchor eNB A1, the anchor eNB A1 may be qualified to be a candidate anchor eNB of the access eNB C1. Therefore, the access eNB C1 may ask the anchor eNB A1 to establish an S1-MME interface for the UE. If there are more than one candidate anchor eNB, the access eNB C1 may select the anchor eNB with the highest ranking to establish the S1-MME interface for the UE. If the best anchor eNB refuses to establish the S1-MME interface for the UE, the access eNB C1 may send the request to the next anchor eNB until there is no more candidate anchor eNBs. In other words, the access eNB may request the selected anchor eNB(s) to establish the S1-MME interface for the UE one by one. If all candidate anchor eNBs refuse to establish the S1-MME interface for the UE, the access eNB has to establish the S1-MME interface for the UE at the access eNB itself.

Figure 5:
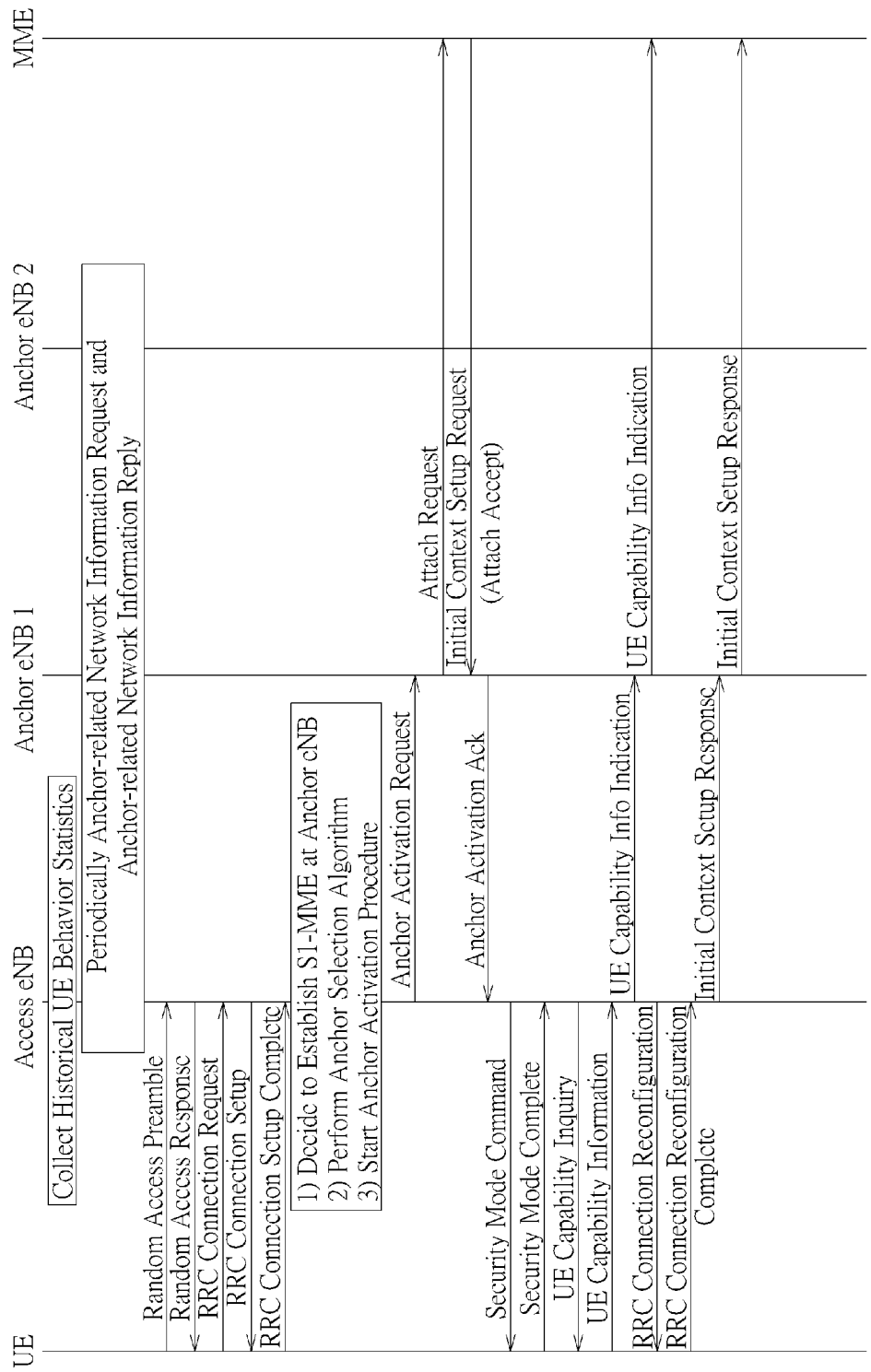
FIGS. 5-37 are signal diagrams of the communication system employing the anchor-based mobility management according to the examples of the present invention.

Please refer to FIG. 5, which illustrates a signaling diagram of the communication system according to an example of the present invention. In this example, the access eNB periodically gathers anchor-related network information and collects historical UE behavior statistics. Through the anchor necessity decision procedure, the access eNB decides to establish an S1-MME interface at an anchor eNB. After performing the anchor selection algorithm, it is found that there are two candidate eNBs (eNB 1 and eNB 2) and the anchor eNB 1 has higher score than the anchor eNB 2. While starting the anchor activation procedure, the access eNB requests the candidate eNBs one by one according to the results of the anchor selection algorithm. The access eNB may first send Anchor Activation Request to the anchor eNB 1. If the access eNB receives an Anchor Activation Acknowledgment (Ack) from the anchor eNB 1, it means that the anchor eNB 1 successfully establishes the S1-MME interface for the UE.

Figure 6:
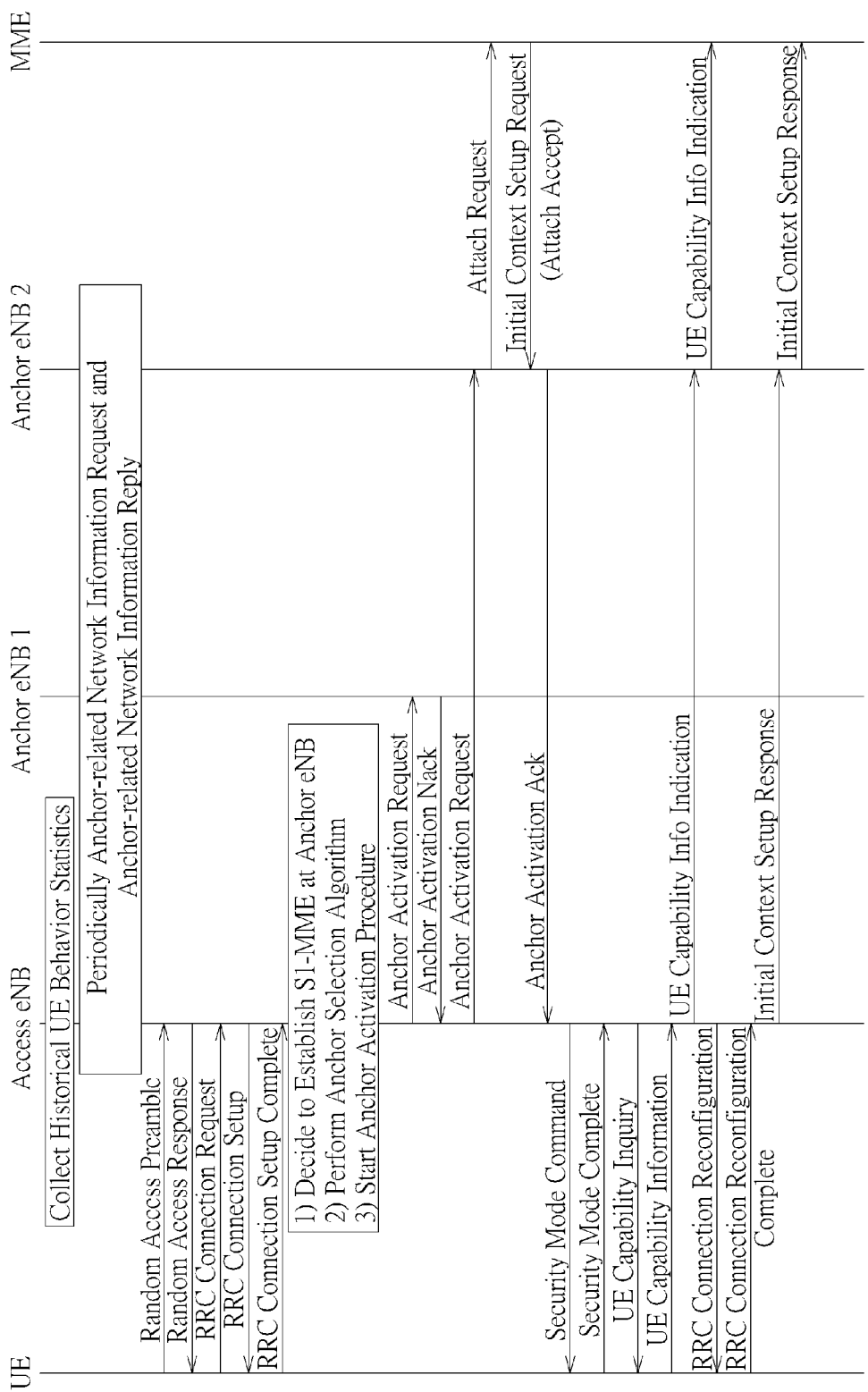

Please refer to FIG. 6, which illustrates a signaling diagram of the communication system according to an example of the present invention. In this example, the access eNB periodically gathers anchor-related network information and collects historical UE behavior statistics. Through the anchor necessity decision procedure, the access eNB decides to establish an S1-MME interface at an anchor eNB. After performing the anchor selection algorithm, it is found that there are two candidate eNBs (eNB 1 and eNB 2) and the anchor eNB 1 has higher score than the anchor eNB 2. While starting the anchor activation procedure, the access eNB requests the candidate eNBs one by one according to the results of the anchor selection algorithm. The access eNB may first send Anchor Activation Request to the anchor eNB 1. If the access eNB receives Anchor Activation Non-acknowledgment (Nack) from the anchor eNB 1, the access eNB may then send Anchor Activation Request to the anchor eNB 2. If the access eNB receives Anchor Activation Ack from the anchor eNB 2, it means that the anchor eNB 2 successfully establishes the S1-MME interface for the UE.

Figure 7:
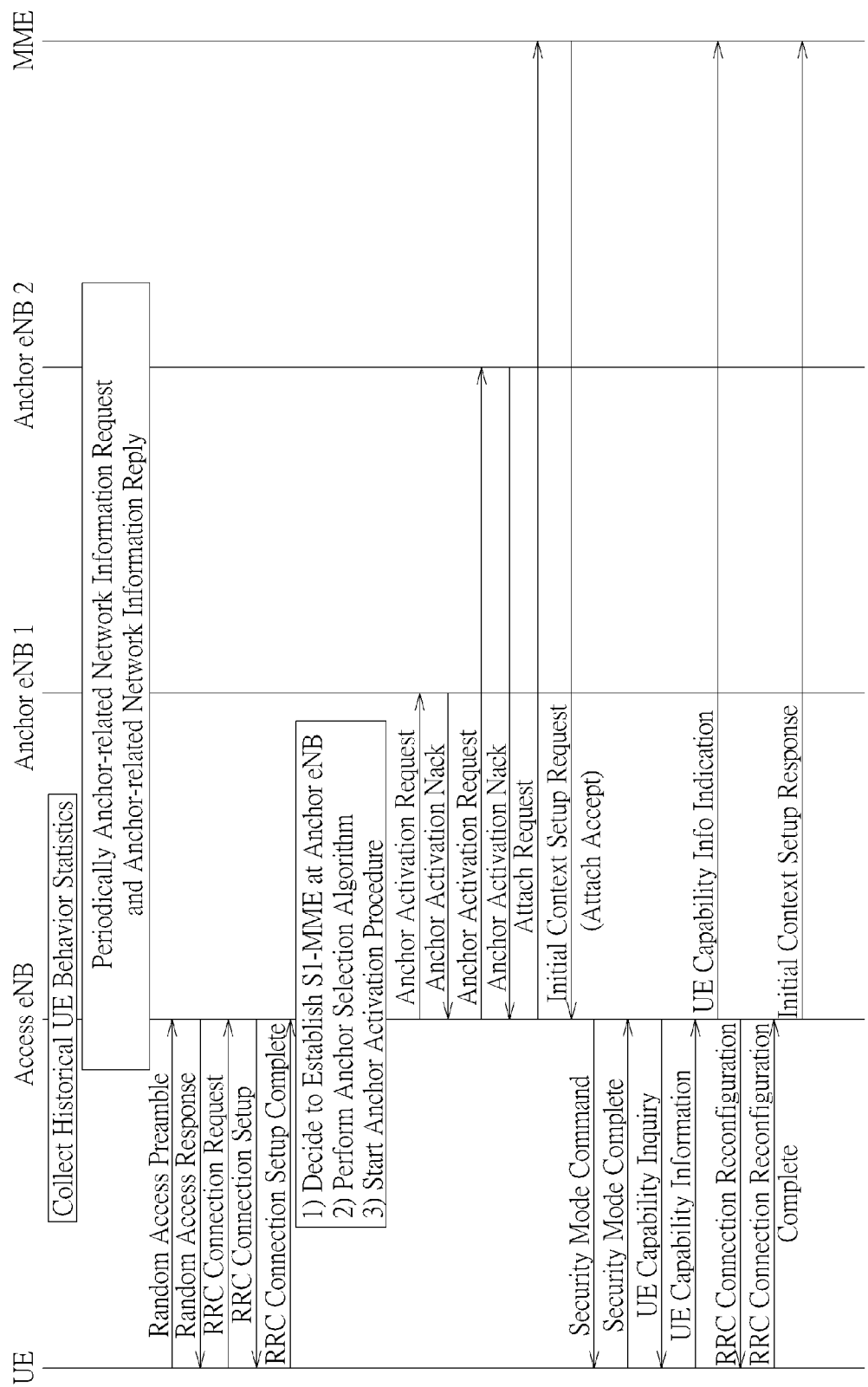

Please refer to FIG. 7, which illustrates a signaling diagram of the communication system according to an example of the present invention. In this example, the access eNB periodically gathers anchor-related network information and collects historical UE behavior statistics. Through the anchor necessity decision procedure, the access eNB decides to establish an S1-MME interface at an anchor eNB. After performing the anchor selection algorithm, it is found that there are two candidate eNBs (eNB 1 and eNB 2) and the anchor eNB 1 has higher score than the anchor eNB 2. While starting the anchor activation procedure, the access eNB requests the candidate eNBs one by one according to the results of the anchor selection algorithm. If the access eNB receives Anchor Activation Nack from all the candidate anchor eNBs after sending Anchor Activation Requests to the candidate anchor eNBs (anchor eNB 1 and anchor eNB 2), the access eNB has to establish the S1-MME interface for the UE at itself.

Figure 8:
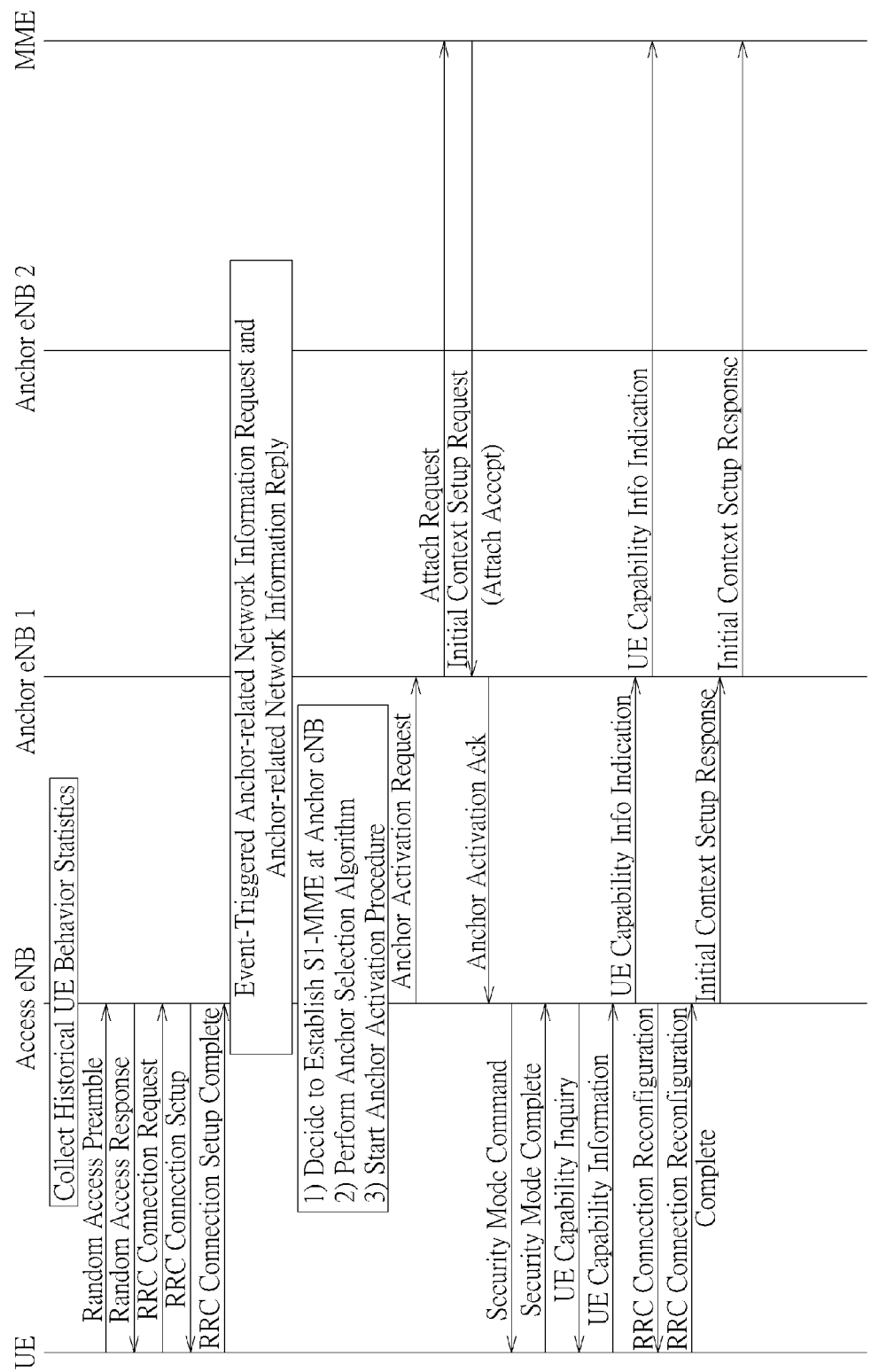

Please refer to FIG. 8, which illustrates a signaling diagram of the communication system according to an example of the present invention. In this example, the access eNB gathers anchor-related network information upon a triggering event and collects historical UE behavior statistics. The access eNB may gather anchor-related network information before the anchor necessity decision procedure as shown in the example, or before performing the anchor selection algorithm while deciding to establish an S1-MME interface at an anchor eNB in an alternative way. After performing the anchor selection algorithm, it is found that there are two candidate eNBs and the anchor eNB 1 has higher score than the anchor eNB 2. While starting the anchor activation procedure, the access eNB may request the candidate eNBs one by one according to the results of the anchor selection algorithm. The access eNB may first send Anchor Activation Request to the anchor eNB 1. If the access eNB receives Anchor Activation Ack from the anchor eNB 1, it means that the anchor eNB 1 successfully establishes the S1-MME interface for the UE.

Figure 9:
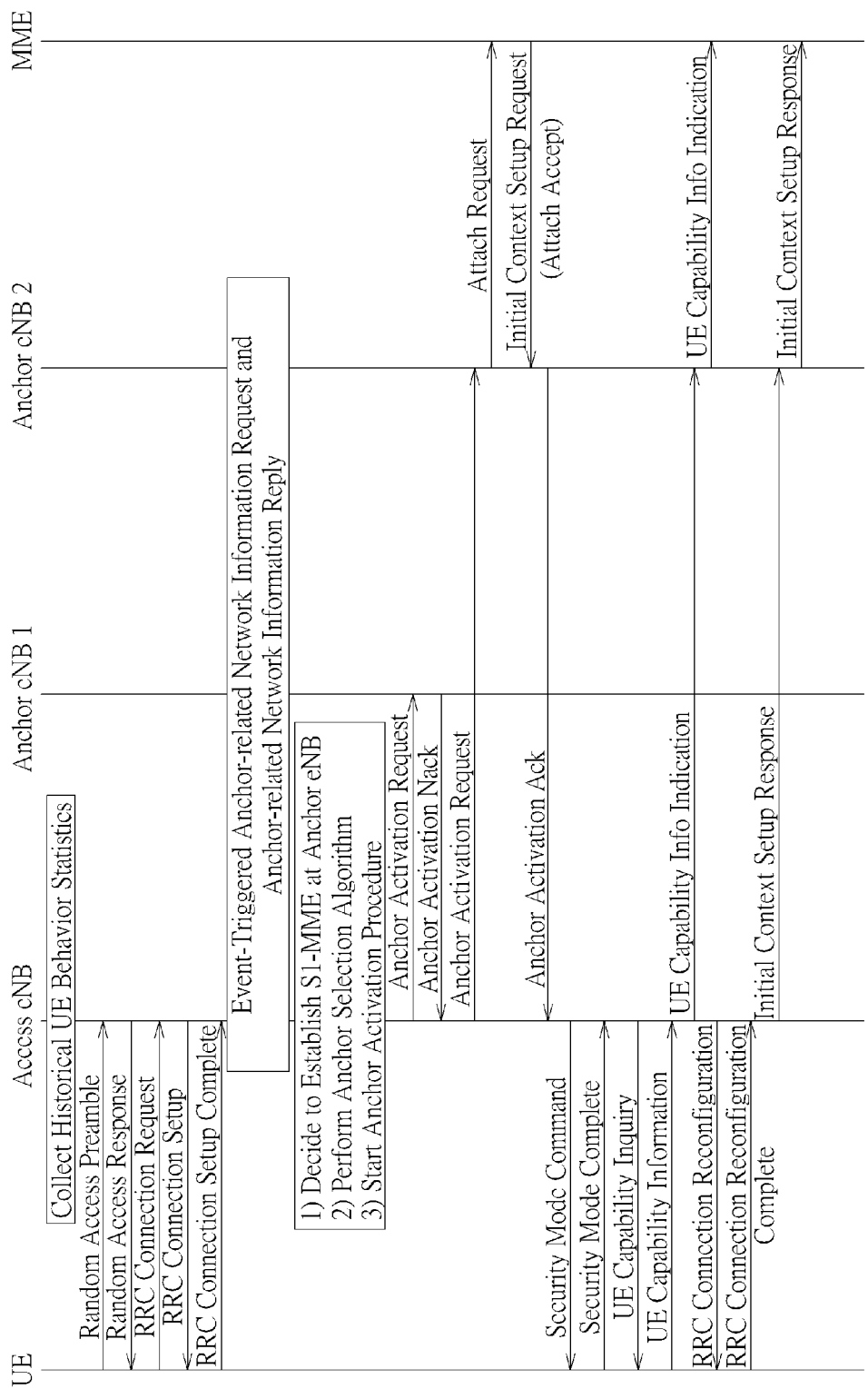

Please refer to FIG. 9, which illustrates a signaling diagram of the communication system according to an example of the present invention. In this example, the access eNB gathers anchor-related network information upon a triggering event and collects historical UE behavior statistics. The access eNB may gather anchor-related network information before the anchor necessity decision procedure as shown in the example, or before performing the anchor selection algorithm while deciding to establish an S1-MME interface at an anchor eNB in an alternative way. After performing the anchor selection algorithm, it is found that there are two candidate eNBs and the anchor eNB 1 has higher score than the anchor eNB 2. While starting the anchor activation procedure, the access eNB may request the candidate eNBs one by one according to the results of the anchor selection algorithm. The access eNB may first send Anchor Activation Request to the anchor eNB 1. If the access eNB receives Anchor Activation Nack from the anchor eNB 1, the access eNB may then send Anchor Activation Request to the anchor eNB 2. If the access eNB receives Anchor Activation Ack from the anchor eNB 2, it means that the anchor eNB 2 successfully establishes the S1-MME interface for the UE.

Figure 10:
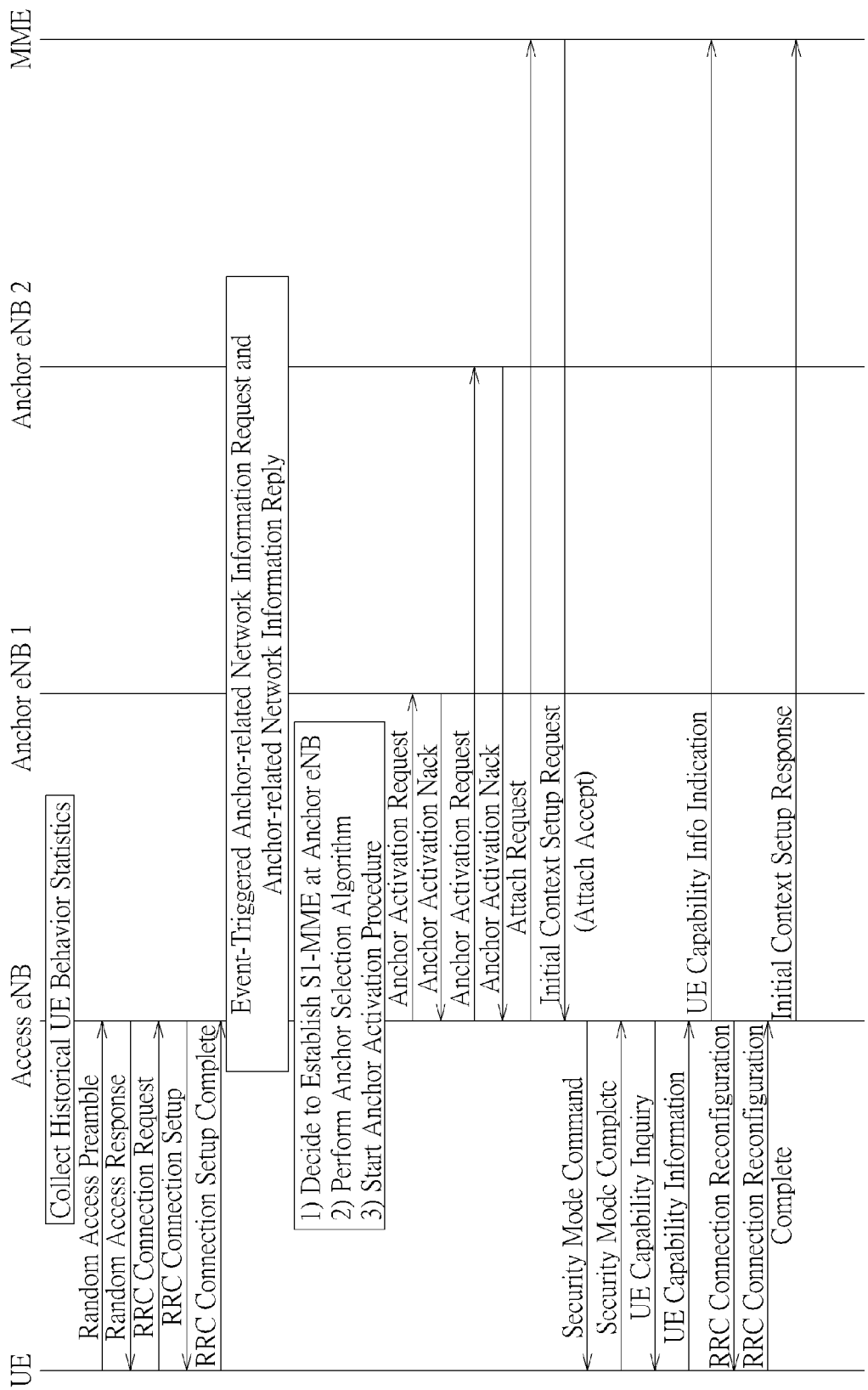

Please refer to FIG. 10, which illustrates a signaling diagram of the communication system according to an example of the present invention. In this example, the access eNB gathers anchor-related network information upon a triggering event and collects historical UE behavior statistics. The access eNB may gather anchor-related network information before the anchor necessity decision procedure as shown in the example, or before performing the anchor selection algorithm while deciding to establish an S1-MME interface at an anchor eNB in an alternative way. After performing the anchor selection algorithm, it is found that there are two candidate eNBs and the anchor eNB 1 has higher score than the anchor eNB 2. While starting the anchor activation procedure, the access eNB may request the candidate eNBs one by one according to the results of the anchor selection algorithm. If the access eNB receives Anchor Activation Nack from all the candidate anchor eNBs after sending Anchor Activation Requests to the candidate anchor eNBs (anchor eNB 1 and anchor eNB 2), the access eNB has to establish the S1-MME interface for the UE at itself.

In another example, the historical UE behavior statistics show that the average TOS in an access eNB C1 is 20 sec, and an anchor eNB A1 with an anchor load of 60% has an anchor constraint of 30 sec for the average TOS. Since the historical UE behavior statistics of the access eNB C1 is below the anchor constraint of the anchor eNB A1, the anchor eNB A1 may be qualified to be a candidate anchor eNB of the access eNB C1. Therefore, the access eNB C1 may ask the anchor eNB A1 to establish an S1-MME interface for the UE. If there are more than one candidate anchor eNB, the access eNB C1 may simultaneously request all the candidate anchor eNBs to establish the S1-MME interface for the UE. If at least one anchor eNB agrees, the access eNB C1 may send the Confirm message to one of the agreed anchor eNB and send the decline message to the other anchor eNBs. If all candidate anchor eNBs refuse to establish the S1-MME interface for the UE, the access eNB has to establish the S1-MME interface for the UE at the access eNB itself.

Figure 11:
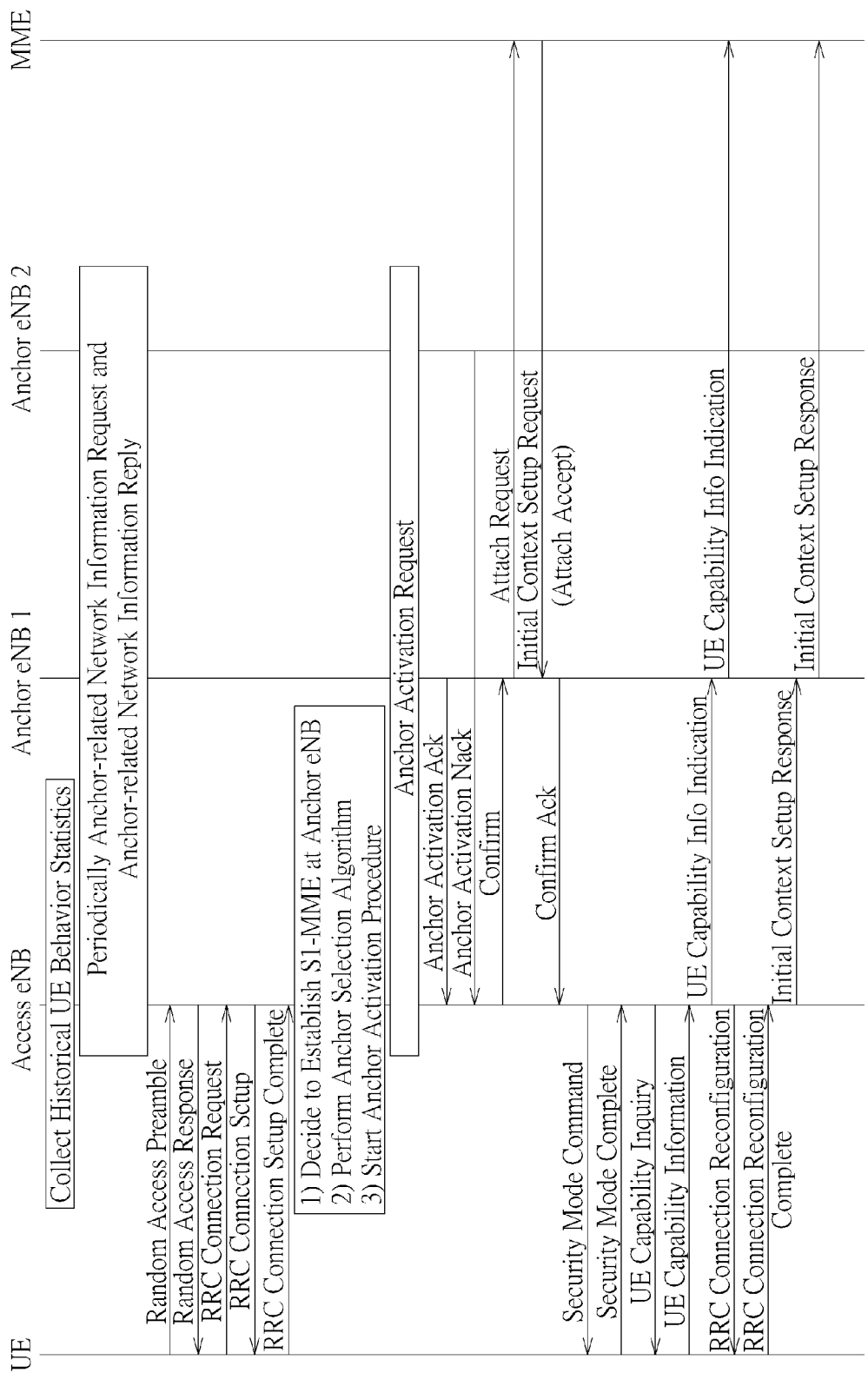

Please refer to FIG. 11, which illustrates a signaling diagram of the communication system according to an example of the present invention. In this example, the access eNB periodically gathers anchor-related network information and collects historical UE behavior statistics. Through the anchor necessity decision procedure, the access eNB decides to establish an S1-MME interface at an anchor eNB. After performing anchor selection algorithm, it is found that there are two candidate eNBs. While starting anchor activation procedure, the access eNB may request all the candidate eNBs simultaneously according to the results of the anchor selection algorithm. The access eNB may send Anchor Activation Request to both the anchor eNB 1 and the anchor eNB 2. If the access eNB receives only one Anchor Activation Ack from an anchor eNB (for example, from the anchor eNB 1) and receives Anchor Activation Nack from the other anchor eNB (or does not receive any other Anchor Activation Ack in a period), the access eNB may send a Confirm message to the anchor eNB 1. After the anchor eNB 1 successfully establishes the S1-MME interface for the UE, it may send Confirm Ack back to the access eNB for notification.

Figure 12:
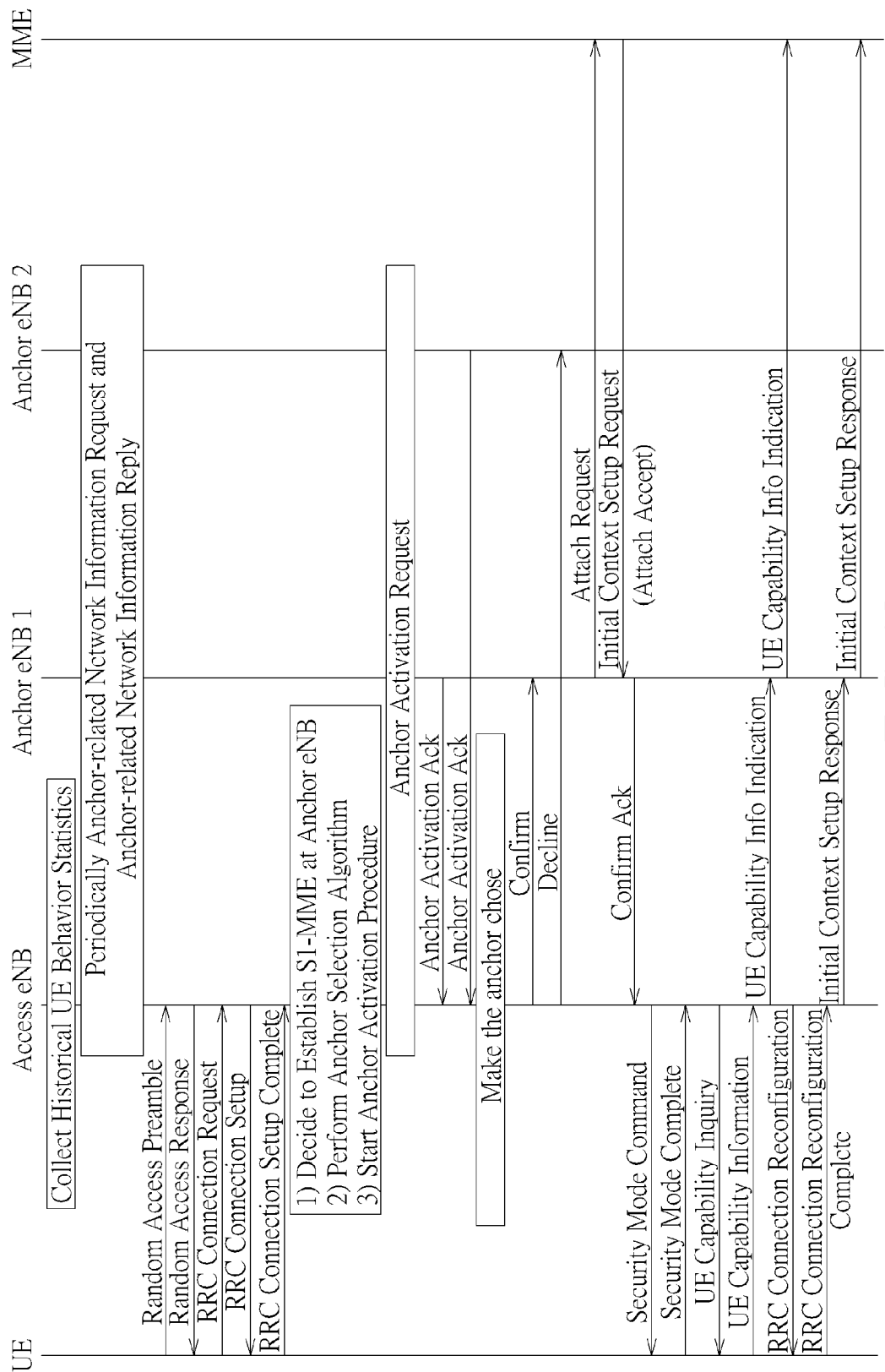

Please refer to FIG. 12, which illustrates a signaling diagram of the communication system according to an example of the present invention. In this example, the access eNB periodically gathers anchor-related network information and collects historical UE behavior statistics. Through the anchor necessity decision procedure, the access eNB decides to establish an S1-MME interface at an anchor eNB. After performing anchor selection algorithm, it is found that there are two candidate eNBs. While starting anchor activation procedure, the access eNB may request all the candidate eNBs simultaneously according to the results of the anchor selection algorithm. The access eNB may send Anchor Activation Request to both the anchor eNB 1 and the anchor eNB 2. The access eNB may receive more than one Anchor Activation Acks. In such a condition, the access eNB may decide which the anchor eNB (anchor eNB1 or anchor eNB2) should be chosen according to the scores calculated in the anchor selection procedure. After making the decision, the access eNB may send a Confirm message to the chosen anchor eNB (for example, to the anchor eNB 1) and send a Decline message to the other anchor eNBs that have sent the Anchor Activation Ack. After the anchor eNB1 successfully establishes the S1-MME interface for the UE, it may send Confirm Ack back to the access eNB for notification.

Figure 13:
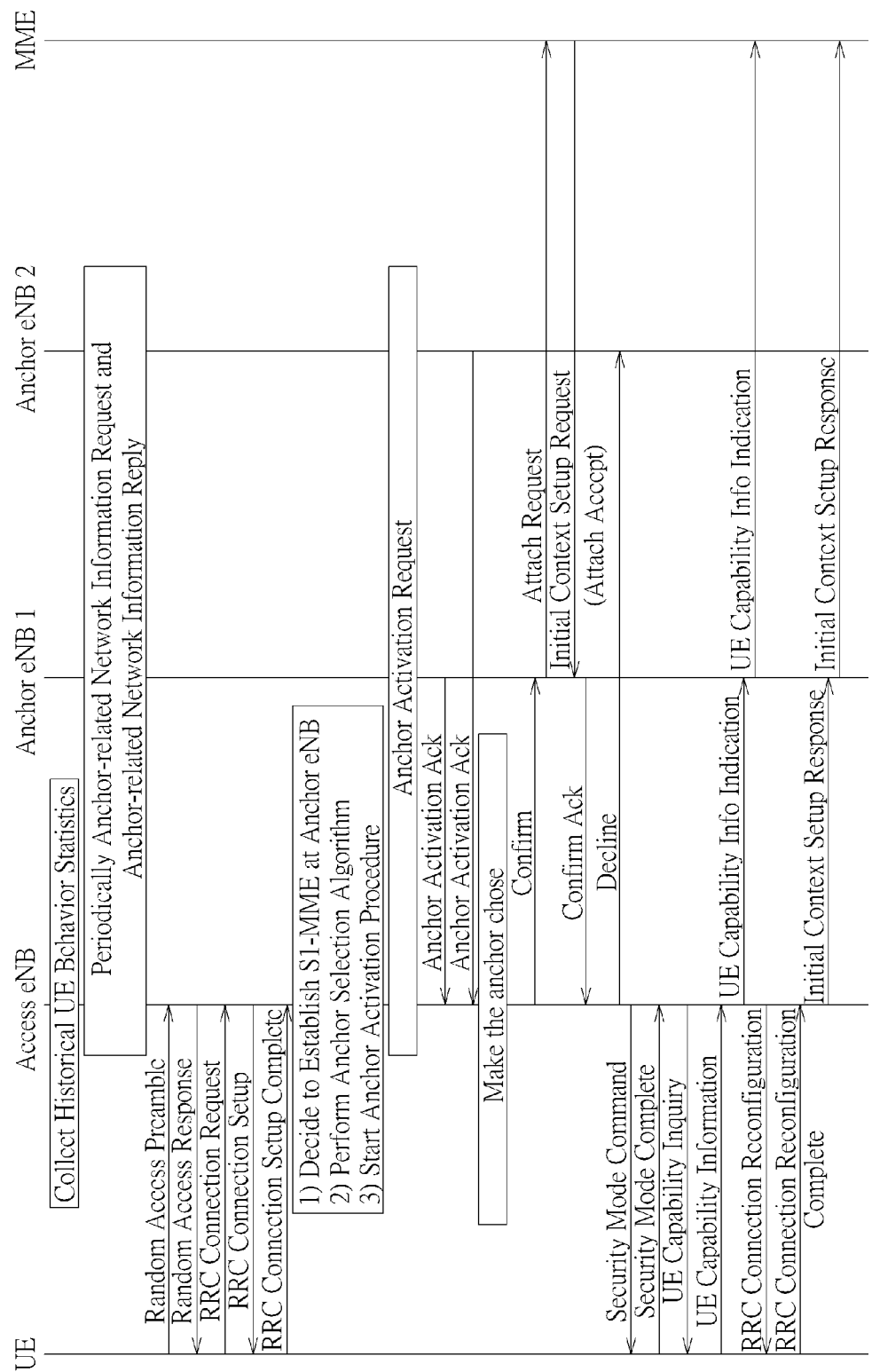

Please refer to FIG. 13, which illustrates a signaling diagram of the communication system according to an example of the present invention. In this example, the access eNB periodically gathers anchor-related network information and collects historical UE behavior statistics. Through the anchor necessity decision procedure, the access eNB decides to establish an S1-MME interface at an anchor eNB. After performing anchor selection algorithm, it is found that there are two candidate eNBs. While starting anchor activation procedure, the access eNB may request all the candidate eNBs simultaneously according to the results of the anchor selection algorithm. The access eNB may send Anchor Activation Request to both the anchor eNB 1 and the anchor eNB 2. The access eNB may receive more than one Anchor Activation Acks. In such a condition, the access eNB may decide which the anchor eNB (anchor eNB1 or anchor eNB2) should be chosen according to the scores calculated in the anchor selection procedure. After making the decision, the access eNB may send a Confirm message to the chosen anchor eNB (for example, to the anchor eNB1). After the anchor eNB1 successfully establishes the S1-MME interface for the UE, it may send Confirm Ack back to the access eNB for notification. After receiving the Confirm Ack, the access eNB may then send a Decline message to other anchor eNBs that have sent the Anchor Activation Ack. This example can avoid the embarrassing situation where the access eNB may not get the Confirm Ack from the chosen anchor eNB (i.e., the anchor eNB1).

Figure 14:
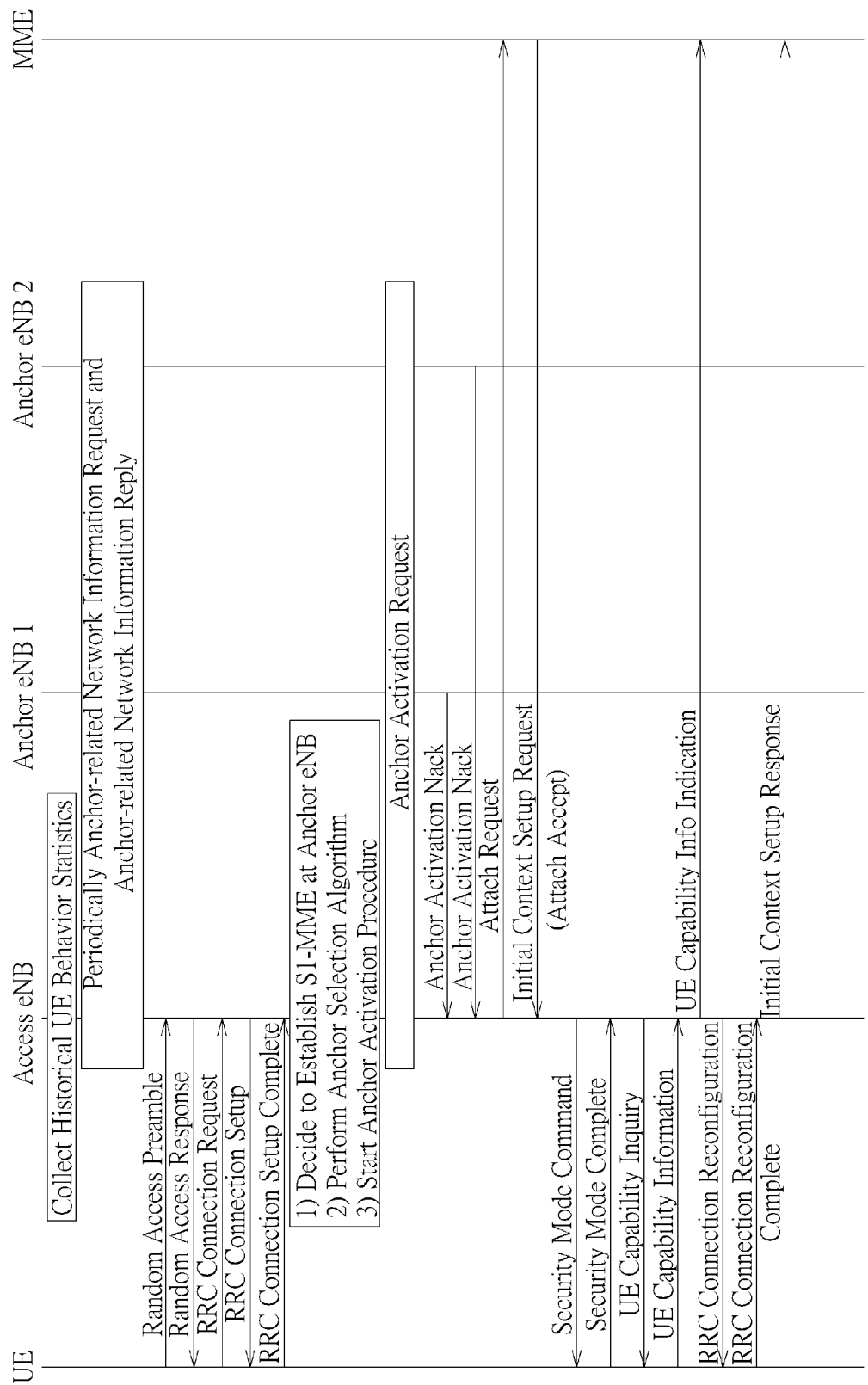

Please refer to FIG. 14, which illustrates a signaling diagram of the communication system according to an example of the present invention. In this example, the access eNB periodically gathers anchor-related network information and collects historical UE behavior statistics. Through the anchor necessity decision procedure, the access eNB decides to establish an S1-MME interface at an anchor eNB. After performing anchor selection algorithm, it is found that there are two candidate eNBs. While starting anchor activation procedure, the access eNB may request all the candidate eNBs simultaneously according to the results of the anchor selection algorithm. The access eNB may send Anchor Activation Request to both the anchor eNB 1 and the anchor eNB 2. If the access eNB receives Anchor Activation Nack from all the candidate anchor eNBs, the access eNB has to establish the S1-MME interface for the UE at itself.

Figure 15:
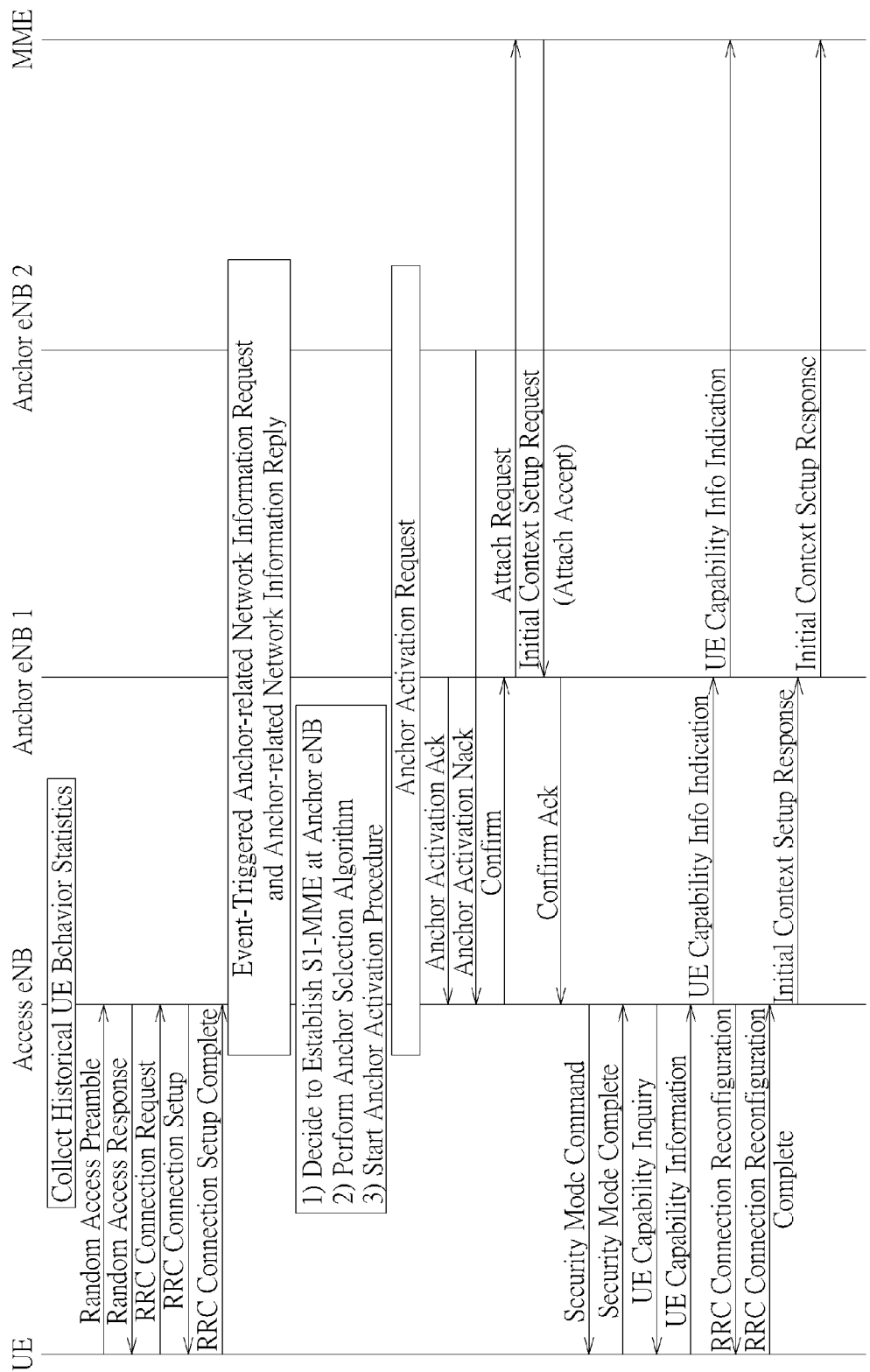

Please refer to FIG. 15, which illustrates a signaling diagram of the communication system according to an example of the present invention. In this example, the access eNB gathers anchor-related network information upon a triggering event and collects historical UE behavior statistics. The access eNB may gather anchor-related network information before the anchor necessity decision procedure as shown in the example, or before performing the anchor selection algorithm while deciding to establish an S1-MME interface at an anchor eNB in an alternative way. After performing the anchor selection algorithm, it is found that there are two candidate eNBs. While starting anchor activation procedure, the access eNB may request all the candidate eNBs simultaneously according to the results of the anchor selection algorithm. The access eNB may send Anchor Activation Request to both the anchor eNB 1 and the anchor eNB 2. If the access eNB receives only one Anchor Activation Ack (for example, from the anchor eNB 1) and receives Anchor Activation Nack from the others (or does not receive other Anchor Activation Ack in a period), the access eNB may send a Confirm message to the anchor eNB 1. After the anchor eNB 1 successfully establishes the S1-MME interface for the UE, it may send Confirm Ack back to the access eNB for notification.

Figure 16:
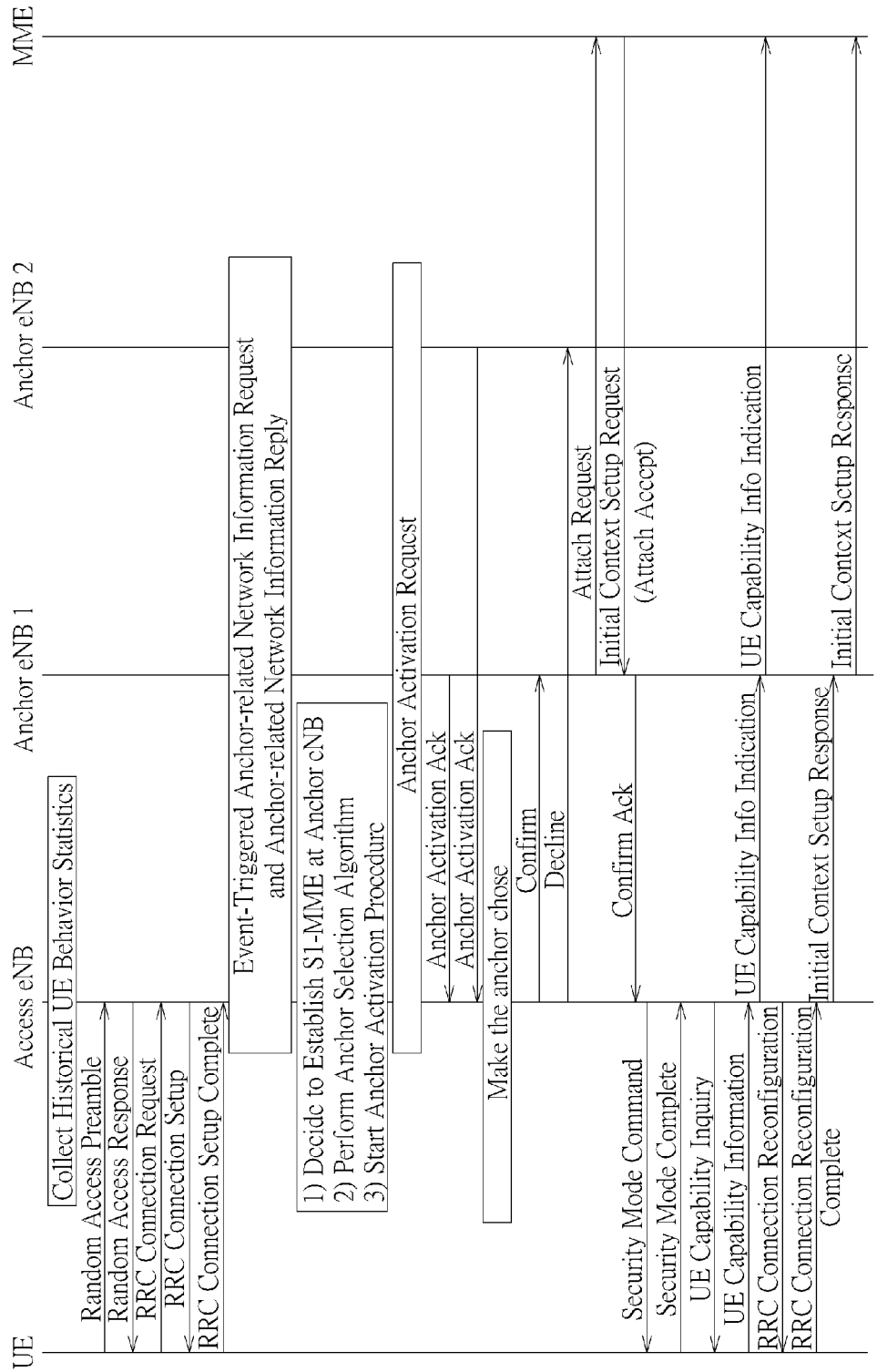

Please refer to FIG. 16, which illustrates a signaling diagram of the communication system according to an example of the present invention. In this example, the access eNB gathers anchor-related network information upon a triggering event and collects historical UE behavior statistics. The access eNB may gather anchor-related network information before the anchor necessity decision procedure as shown in the example, or before performing the anchor selection algorithm while deciding to establish an S1-MME interface at an anchor eNB in an alternative way. After performing the anchor selection algorithm, it is found that there are two candidate eNBs. While starting anchor activation procedure, the access eNB may request all the candidate eNBs simultaneously according to the results of the anchor selection algorithm. The access eNB may send Anchor Activation Request to both the anchor eNB 1 and the anchor eNB 2. If the access eNB receives more than one Anchor Activation Ack, the access eNB may decide which anchor eNB should be chosen for establishing the S1-MME interface according to the scores calculated in the anchor selection procedure. After making the decision, the access eNB may send a Confirm message to the chosen anchor eNB (for example, to the anchor eNB 1) and send a Decline message to other anchor eNBs that have sent the Anchor Activation Ack. After the anchor eNB 1 successfully establishes the S1-MME interface for the UE, it may send Confirm Ack back to the access eNB for notification.

Figure 17:
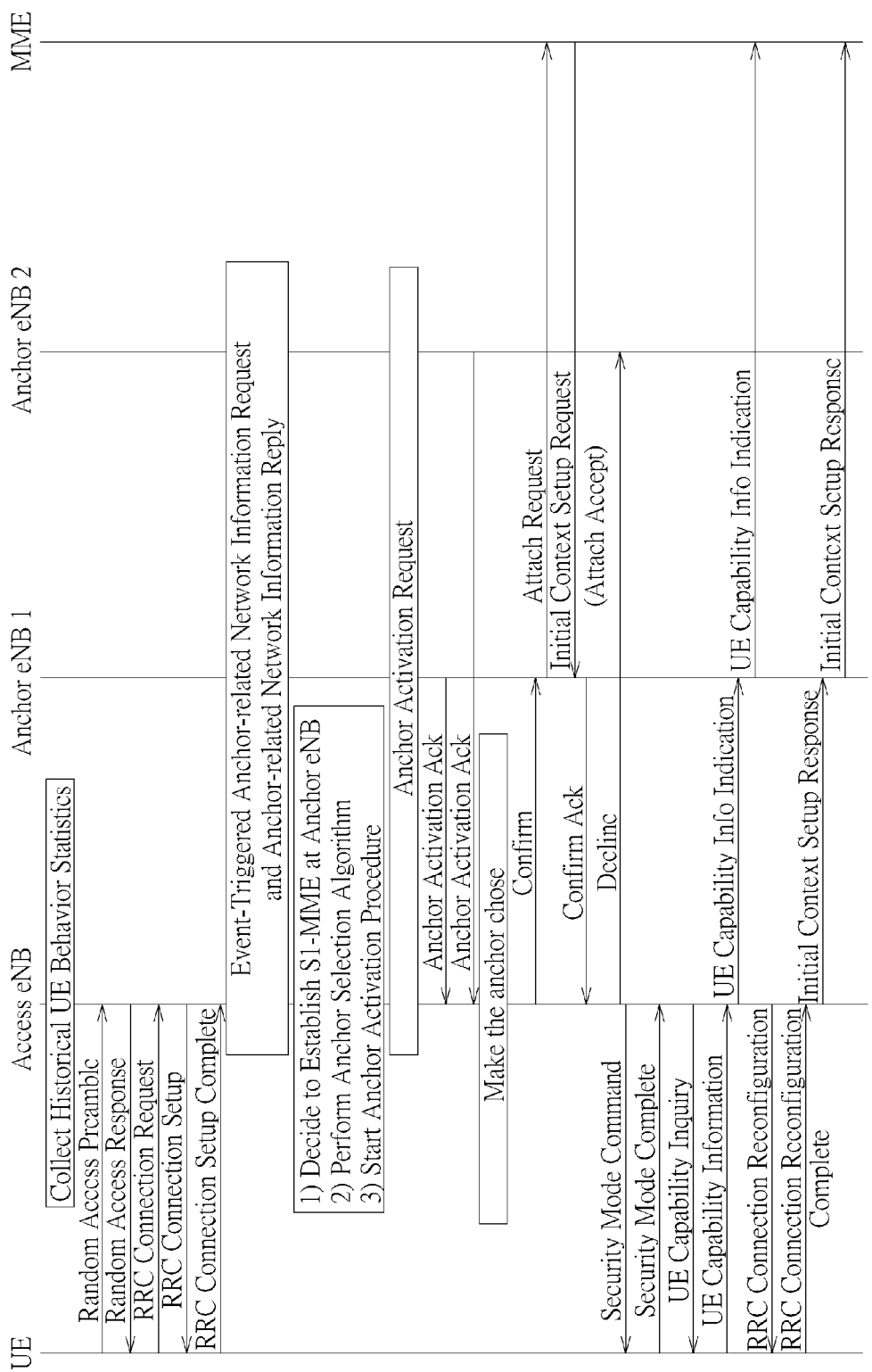

Please refer to FIG. 17, which illustrates a signaling diagram of the communication system according to an example of the present invention. In this example, the access eNB gathers anchor-related network information upon a triggering event and collects historical UE behavior statistics. The access eNB may gather anchor-related network information before the anchor necessity decision procedure as shown in the example, or before performing the anchor selection algorithm while deciding to establish an S1-MME interface at an anchor eNB in an alternative way. After performing the anchor selection algorithm, it is found that there are two candidate eNBs. While starting anchor activation procedure, the access eNB may request all the candidate eNBs simultaneously according to the results of the anchor selection algorithm. The access eNB may send Anchor Activation Request to both the anchor eNB 1 and the anchor eNB 2. If the access eNB receives more than one Anchor Activation Ack, the access eNB may decide which anchor eNB should be chosen for establishing the S1-MME interface according to the scores calculated in the anchor selection procedure. After making the decision, the access eNB may send a Confirm message to the chosen anchor eNB (for example, to the anchor eNB 1). After the anchor eNB 1 successfully establishes the S1-MME interface for the UE, it may send Confirm Ack back to the access eNB for notification. After receiving Confirm Ack, the access eNB may then send a Decline message to the other anchor eNBs that have sent the Anchor Activation Ack. This example can avoid the embarrassing situation where the access eNB may not get the Confirm Ack from the chosen anchor eNB (i.e., the anchor eNB1).

Figure 18:
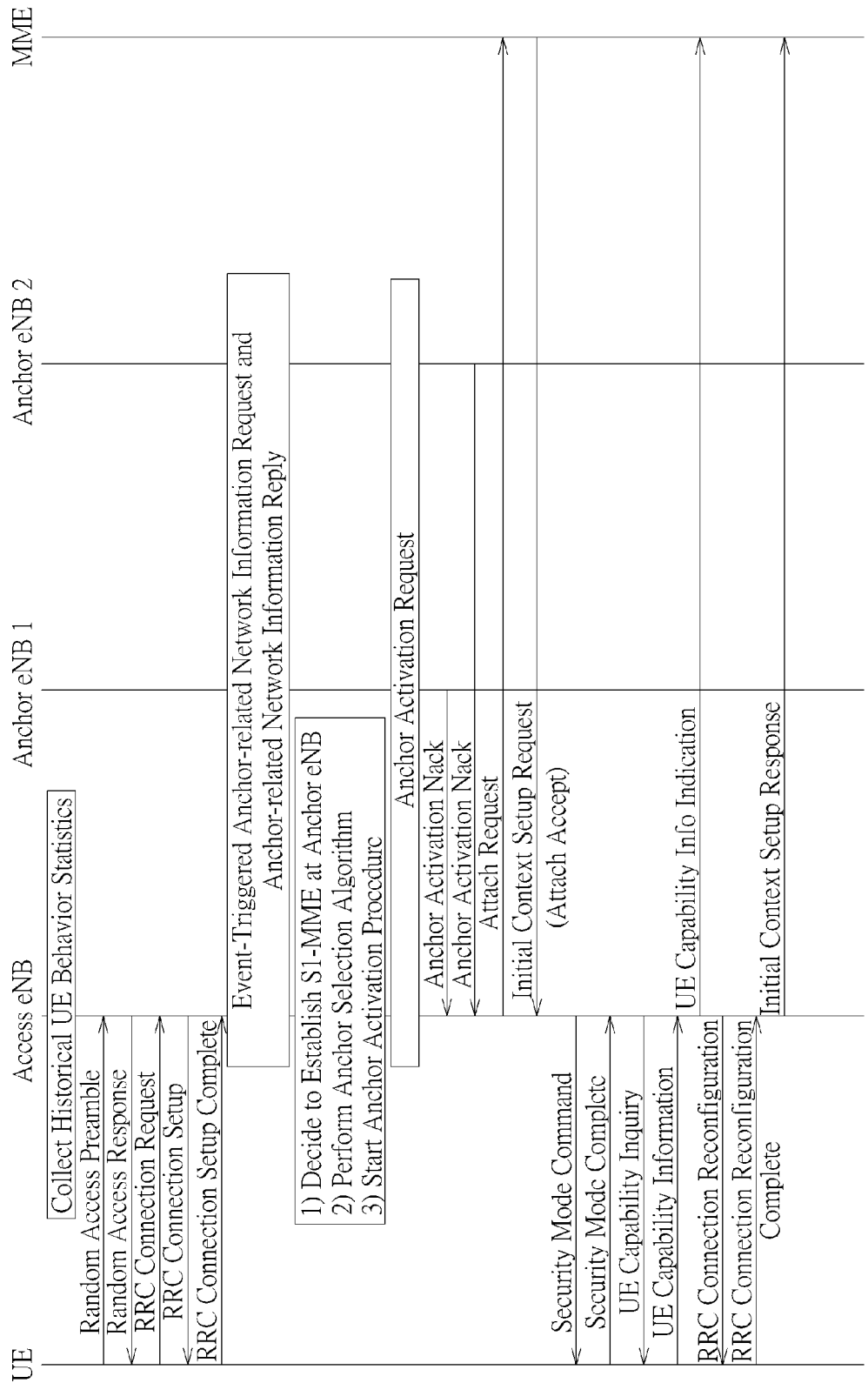

Please refer to FIG. 18, which illustrates a signaling diagram of the communication system according to an example of the present invention. In this example, the access eNB gathers anchor-related network information upon a triggering event and collects historical UE behavior statistics. The access eNB may gather anchor-related network information before the anchor necessity decision procedure as shown in the example, or before performing the anchor selection algorithm while deciding to establish an S1-MME interface at an anchor eNB in an alternative way. After performing the anchor selection algorithm, it is found that there are two candidate eNBs. While starting anchor activation procedure, the access eNB may request all the candidate eNBs simultaneously according to the results of the anchor selection algorithm. The access eNB may send Anchor Activation Request to both the anchor eNB 1 and the anchor eNB 2. If the access eNB receives Anchor Activation Nack from all its candidate anchor eNBs, the access eNB has to establish the S1-MME interface for the UE at itself.

The following descriptions and FIGS. 19-32 specify examples when the anchor-based mobility management mechanism is activated with UE assistant information while the UE is transiting from an IDLE mode to a Connected mode.

In an example, an anchor eNB A1 with an anchor load of 60% has an anchor constraint of 30 sec for the average TOS. If the average TOS of a UE from the UE assistant information is below the anchor constraint of the anchor eNB A1, the anchor eNB A1 may be qualified to be a candidate anchor eNB for the UE. Therefore, the access eNB C1 may ask the anchor eNB A1 to establish an S1-MME interface for the UE. If there are more than one candidate anchor eNB, the access eNB C1 may select the anchor eNB with the highest ranking to establish the S1-MME interface for the UE. If the best anchor eNB refuses to establish the S1-MME interface for the UE, the access eNB C1 may send the request to the next anchor eNB until there is no more candidate anchor eNBs. In other words, the access eNB may request the selected anchor eNB(s) to establish the S1-MME interface for the UE one by one. If all candidate anchor eNBs refuse to establish the S1-MME interface for the UE, the access eNB has to establish the S1-MME interface for the UE at the access eNB itself.

Figure 19:
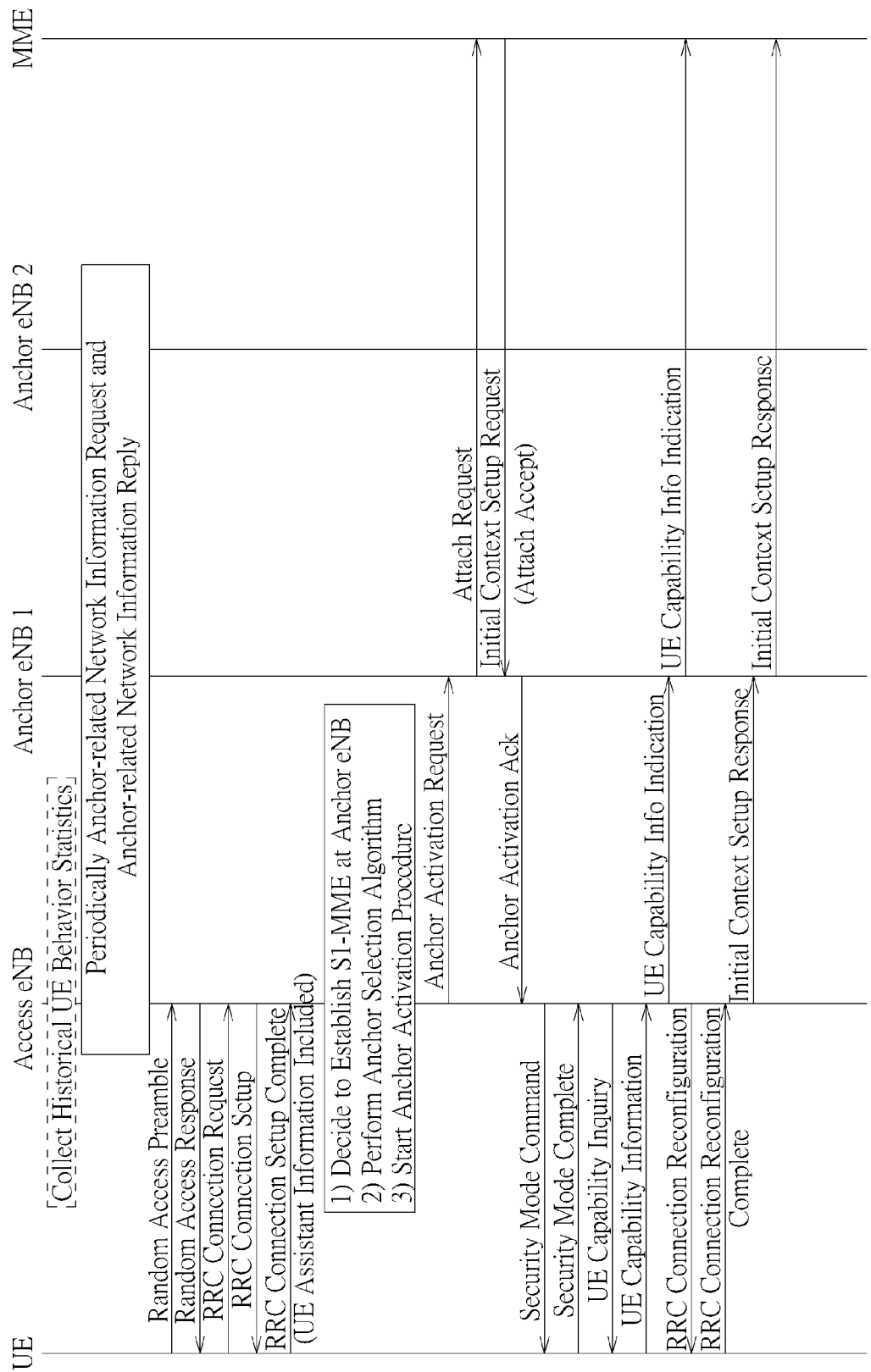

Please refer to FIG. 19, which illustrates a signaling diagram of the communication system according to an example of the present invention. In this example, the access eNB periodically gathers anchor-related network information and the UE provides UE assistant information. Through the anchor necessity decision procedure, the access eNB decides to establish an S1-MME interface at an anchor eNB. After performing anchor selection algorithm, it is found that there are two candidate eNBs and the anchor eNB 1 has higher score than the anchor eNB 2. While starting the anchor activation procedure, the access eNB may request the candidate eNBs one by one according to the results of the anchor selection algorithm. The access eNB may first send Anchor Activation Request to the anchor eNB 1. If the access eNB receives Anchor Activation Ack from the anchor eNB 1, it means that the anchor eNB 1 successfully establishes the S1-MME interface for the UE.

Figure 20:
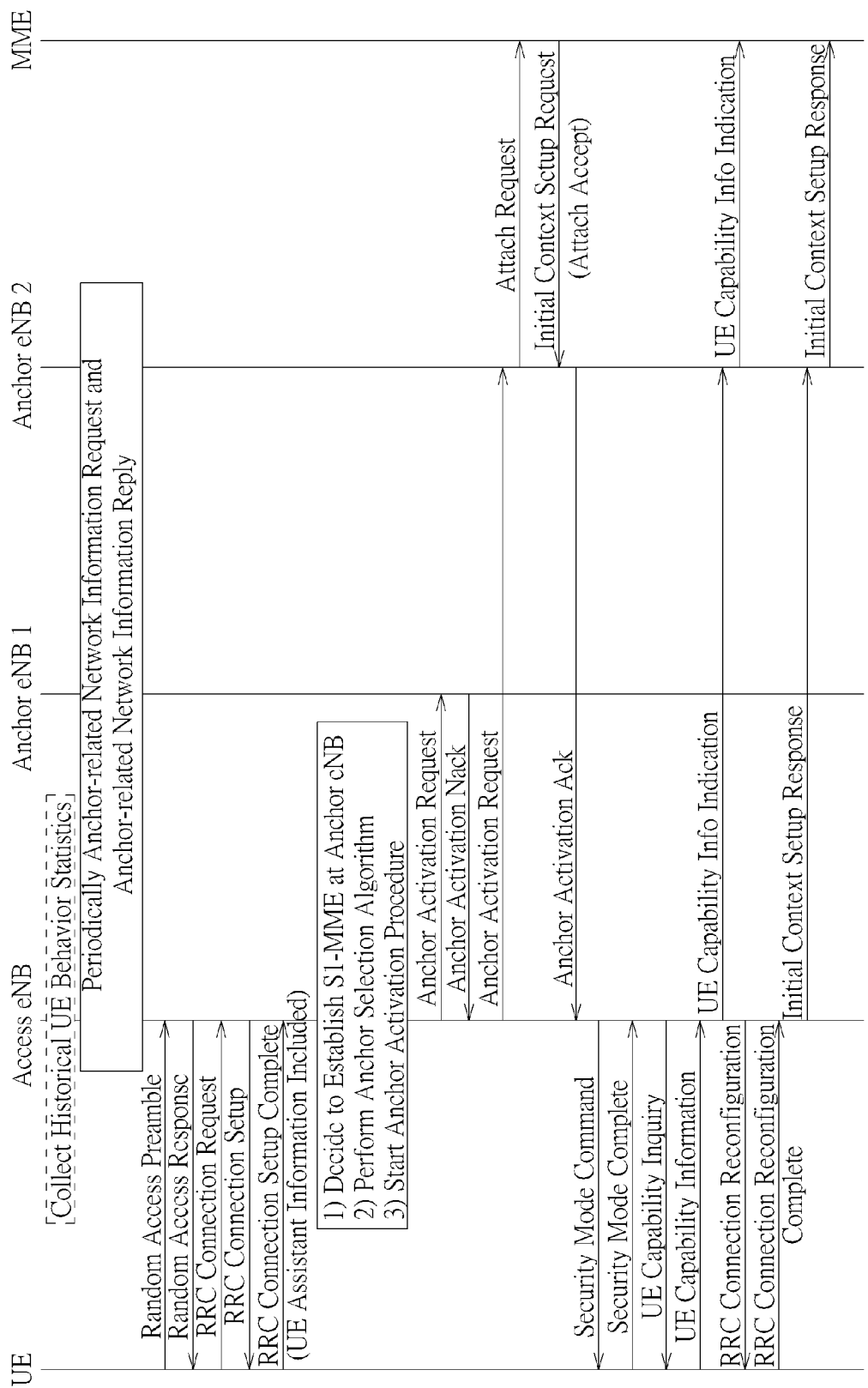

Please refer to FIG. 20, which illustrates a signaling diagram of the communication system according to an example of the present invention. In this example, the access eNB periodically gathers anchor-related network information and the UE provides UE assistant information. Through the anchor necessity decision procedure, the access eNB decides to establish an S1-MME interface at an anchor eNB. After performing anchor selection algorithm, it is found that there are two candidate eNBs and the anchor eNB 1 has higher score than the anchor eNB 2. While starting the anchor activation procedure, the access eNB may request the candidate eNBs one by one according to the results of the anchor selection algorithm. The access eNB may first send Anchor Activation Request to the anchor eNB 1. If the access eNB receives Anchor Activation Nack from the anchor eNB 1, the access eNB may then send Anchor Activation Request to the anchor eNB 2. If the access eNB receives Anchor Activation Ack from the anchor eNB 2, it means that the anchor eNB 2 successfully establishes the S1-MME interface for the UE.

Figure 21:
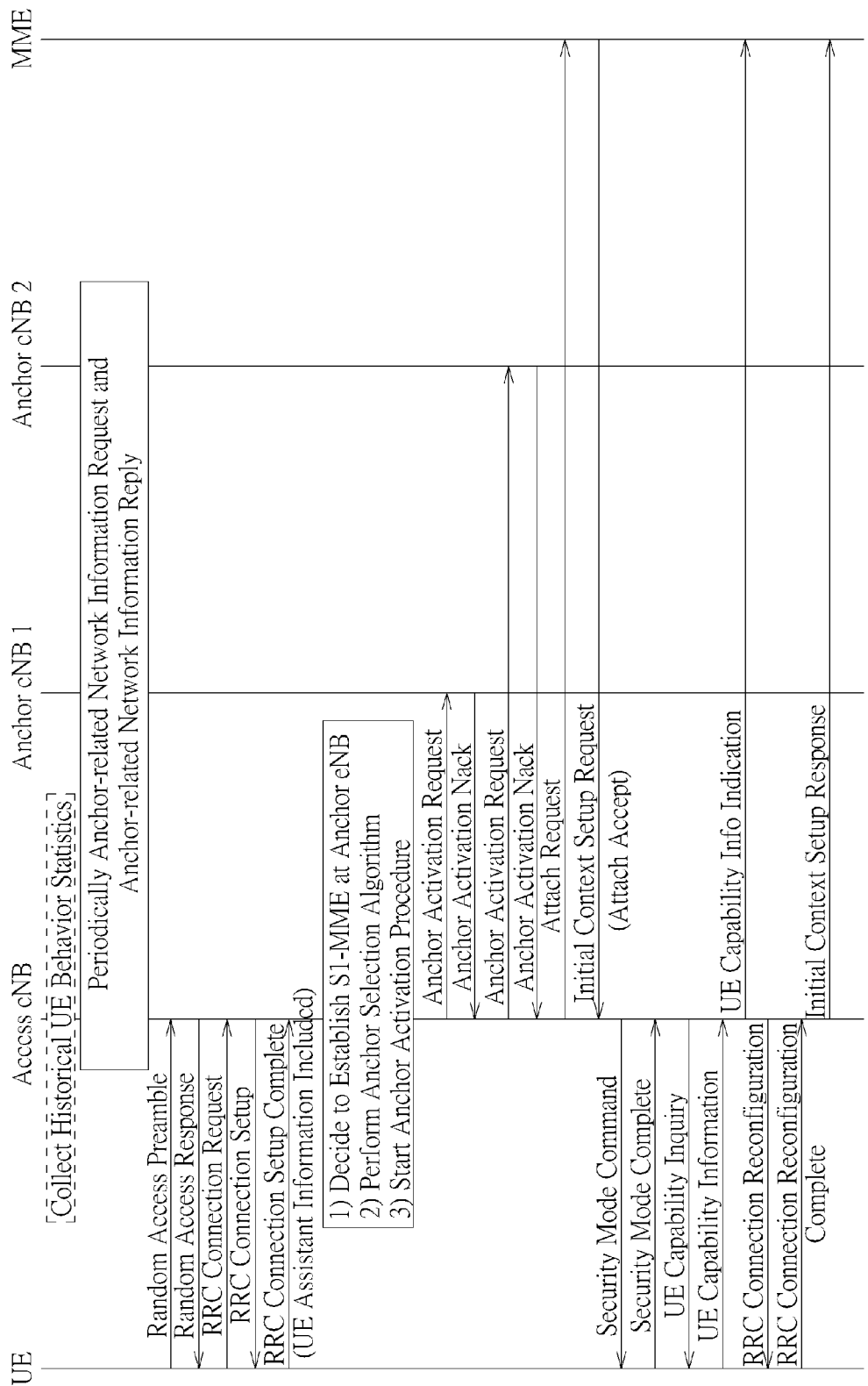

Please refer to FIG. 21, which illustrates a signaling diagram of the communication system according to an example of the present invention. In this example, the access eNB periodically gathers anchor-related network information and the UE provides UE assistant information. Through the anchor necessity decision procedure, the access eNB decides to establish an S1-MME interface at an anchor eNB. After performing anchor selection algorithm, it is found that there are two candidate eNBs and the anchor eNB 1 has higher score than the anchor eNB 2. While starting the anchor activation procedure, the access eNB may request the candidate eNBs one by one according to the results of the anchor selection algorithm. If the access eNB receives Anchor Activation Nack from all candidate anchor eNBs after sending Anchor Activation Request to all the candidate anchor eNBs, the access eNB has to establish the S1-MME interface for the UE at itself.

Figure 22:
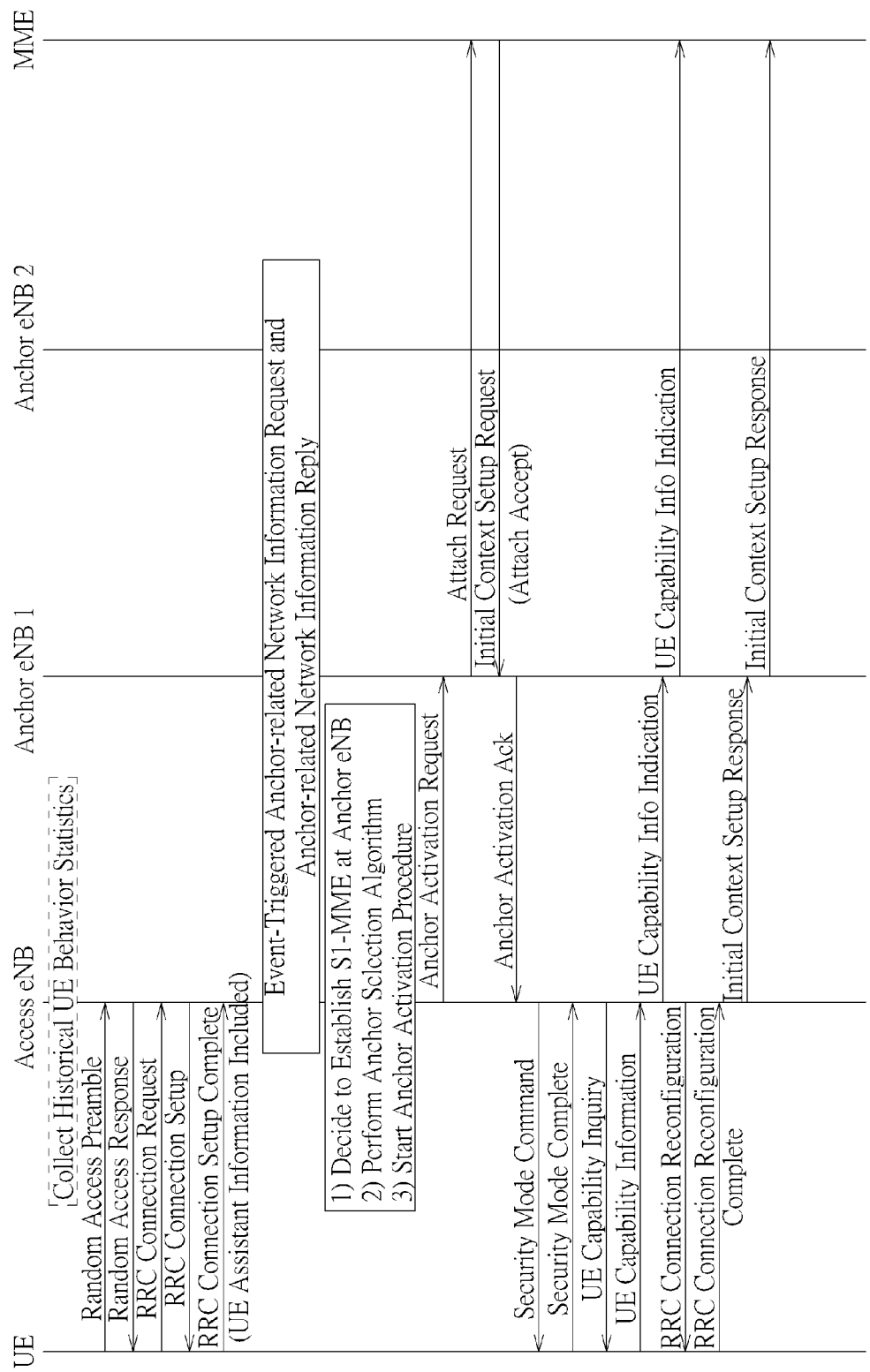

Please refer to FIG. 22, which illustrates a signaling diagram of the communication system according to an example of the present invention. In this example, the access eNB gathers anchor-related network information upon a triggering event and the UE provides UE assistant information. The access eNB may gather anchor-related network information before the anchor necessity decision procedure as shown in the example, or before performing the anchor selection algorithm while deciding to establish an S1-MME interface at an anchor eNB in an alternative way. Through the anchor necessity decision procedure, the access eNB decides to establish an S1-MME interface at an anchor eNB. After performing anchor selection algorithm, it is found that there are two candidate eNBs and the anchor eNB 1 has higher score than the anchor eNB 2. While starting the anchor activation procedure, the access eNB may request the candidate eNBs one by one according to the results of the anchor selection algorithm. The access eNB may first send Anchor Activation Request to the anchor eNB 1. If the access eNB receives Anchor Activation Ack from the anchor eNB 1, it means that the anchor eNB 1 successfully establishes the S1-MME interface for the UE.

Figure 23:
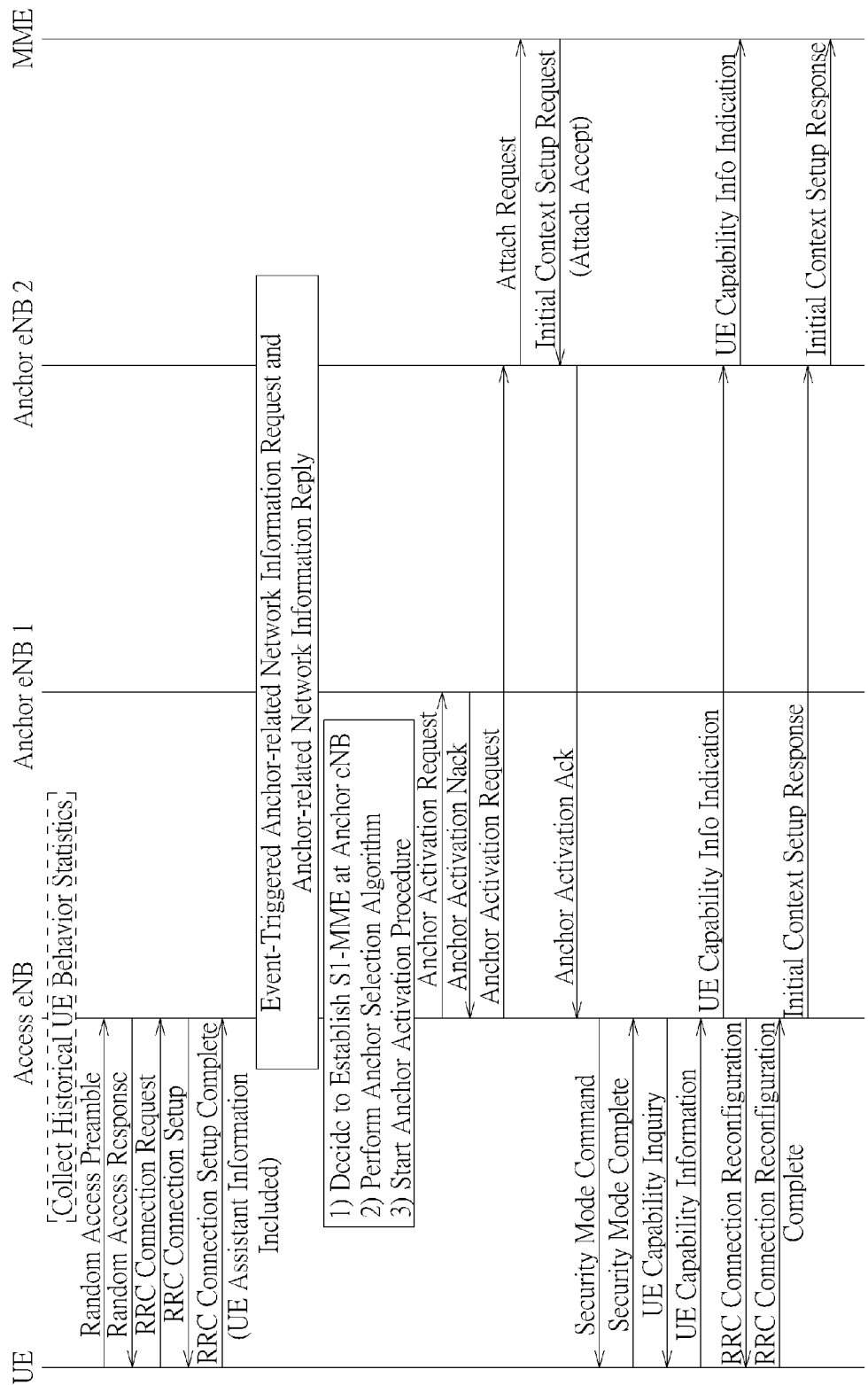

Please refer to FIG. 23, which illustrates a signaling diagram of the communication system according to an example of the present invention. In this example, the access eNB gathers anchor-related network information upon a triggering event and the UE provides UE assistant information. The access eNB may gather anchor-related network information before the anchor necessity decision procedure as shown in the example, or before performing the anchor selection algorithm while deciding to establish an S1-MME interface at an anchor eNB in an alternative way. Through the anchor necessity decision procedure, the access eNB decides to establish an S1-MME interface at an anchor eNB. After performing anchor selection algorithm, it is found that there are two candidate eNBs and the anchor eNB 1 has higher score than the anchor eNB 2. While starting the anchor activation procedure, the access eNB may request the candidate eNBs one by one according to the results of the anchor selection algorithm. The access eNB may first send Anchor Activation Request to the anchor eNB 1. If the access eNB receives Anchor Activation Nack from the anchor eNB 1, the access eNB may then send Anchor Activation Request to the anchor eNB 2. If the access eNB receives Anchor Activation Ack from the anchor eNB 2, it means that the anchor eNB 2 successfully establishes the S1-MME interface for the UE.

Figure 24:
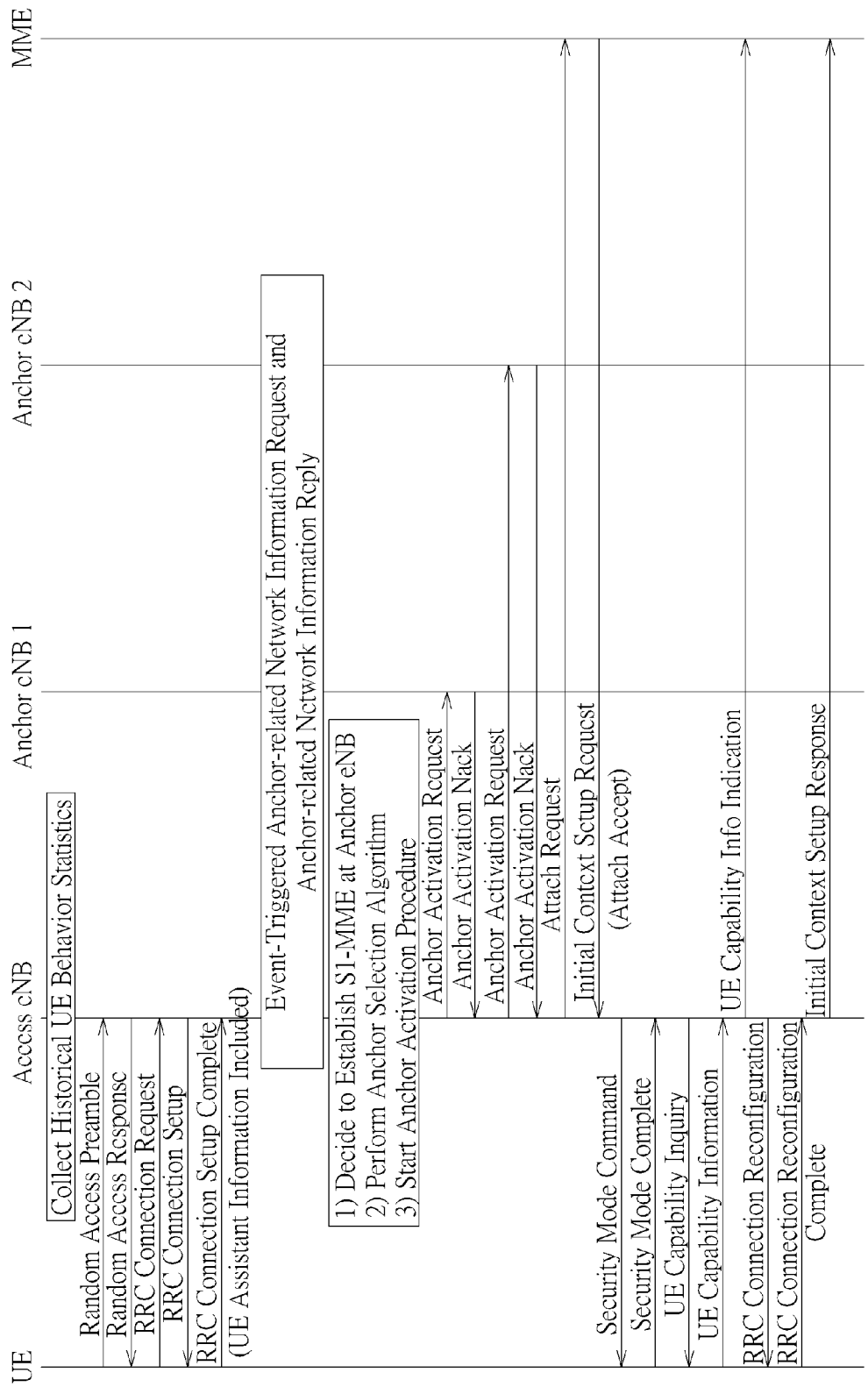

Please refer to FIG. 24, which illustrates a signaling diagram of the communication system according to an example of the present invention. In this example, the access eNB gathers anchor-related network information upon a triggering event and the UE provides UE assistant information. The access eNB may gather anchor-related network information before the anchor necessity decision procedure as shown in the example, or before performing the anchor selection algorithm while deciding to establish an S1-MME interface at an anchor eNB in an alternative way. Through the anchor necessity decision procedure, the access eNB decides to establish an S1-MME interface at an anchor eNB. After performing anchor selection algorithm, it is found that there are two candidate eNBs and the anchor eNB 1 has higher score than the anchor eNB 2. While starting the anchor activation procedure, the access eNB may request the candidate eNBs one by one according to the results of the anchor selection algorithm. If the access eNB receives Anchor Activation Nack from all candidate anchor eNBs after sending Anchor Activation Request to all its candidate anchor eNBs, the access eNB has to establish the S1-MME interface for the UE at itself.

In another example, an anchor eNB A1 with an anchor load of 60% has an anchor constraint of 30 sec for the average TOS. If the average TOS of a UE from the UE assistant information is below the anchor constraint of the anchor eNB A1, the anchor eNB A1 may be qualified to be a candidate anchor eNB for the UE. Therefore, the access eNB C1 may ask the anchor eNB A1 to establish an S1-MME interface for the UE. If there are more than one candidate anchor eNB, the access eNB C1 may simultaneously request all the candidate anchor eNBs to establish the S1-MME interface for the UE. If at least one anchor eNB agrees, the access eNB C1 may send the confirm message to one of the agreed anchor eNB and send the decline message to the other anchor eNBs. If all candidate anchor eNBs refuse to establish the S1-MME interface for the UE, the access eNB has to establish the S1-MME interface for the UE at the access eNB itself.

Figure 25:
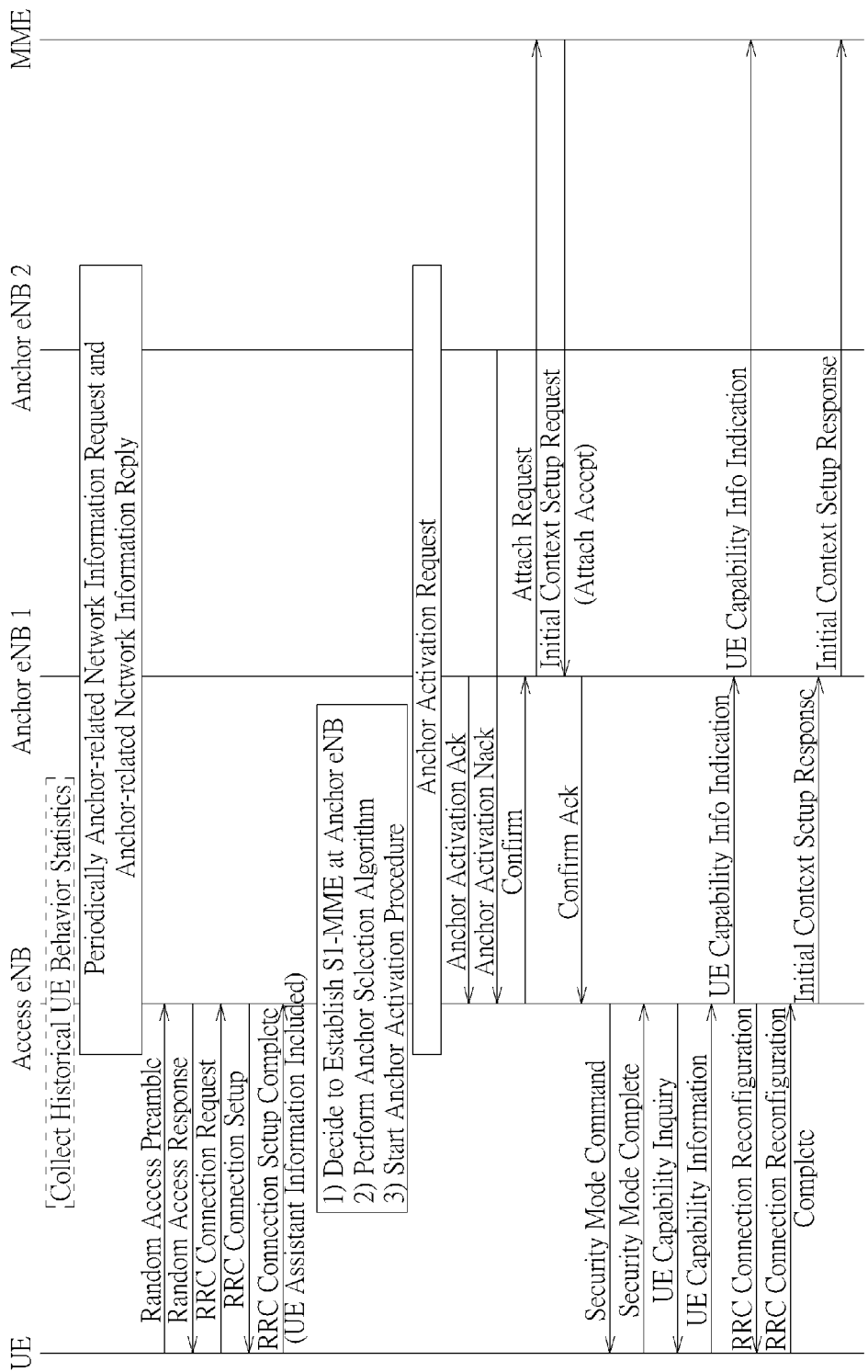

Please refer to FIG. 25, which illustrates a signaling diagram of the communication system according to an example of the present invention. In this example, the access eNB periodically gathers anchor-related network information and the UE provides UE assistant information. Through the anchor necessity decision procedure, the access eNB decides to establish an S1-MME interface at an anchor eNB. After performing anchor selection algorithm, it is found that there are two candidate eNBs. While starting anchor activation procedure, the access eNB may request all the candidate eNBs simultaneously according to the results of the anchor selection algorithm. The access eNB may send Anchor Activation Request to both the anchor eNB 1 and the anchor eNB 2. If the access eNB receives only one Anchor Activation Ack from an anchor eNB (for example, from the anchor eNB 1) and receives Anchor Activation Nack from the other anchor eNB (or does not receive any other Anchor Activation Ack in a period), the access eNB may send a Confirm message to the anchor eNB 1. After the anchor eNB 1 successfully establishes the S1-MME interface for the UE, it may send Confirm Ack back to the access eNB for notification.

Figure 26:
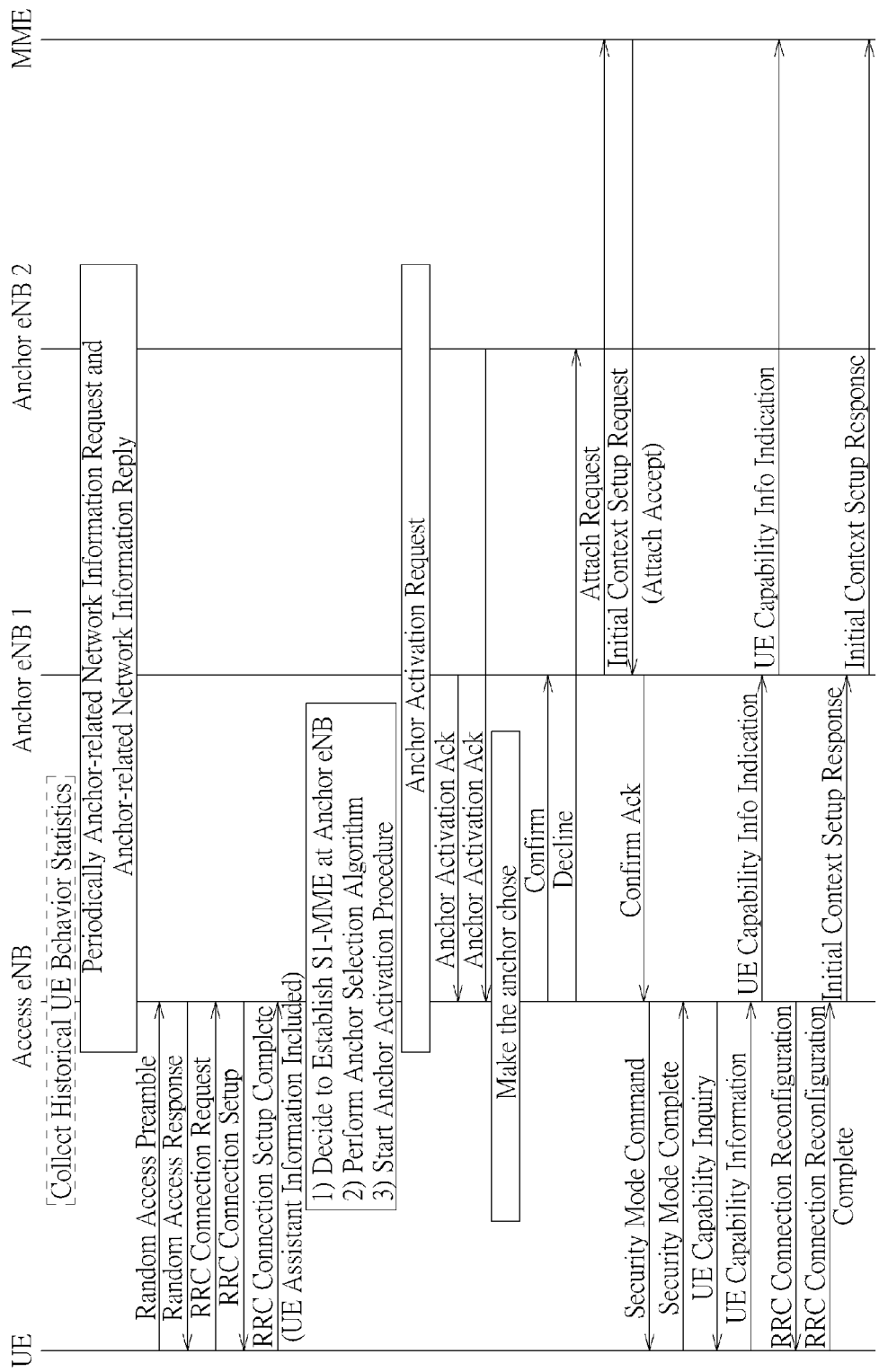

Please refer to FIG. 26, which illustrates a signaling diagram of the communication system according to an example of the present invention. In this example, the access eNB periodically gathers anchor-related network information and the UE provides UE assistant information. Through the anchor necessity decision procedure, the access eNB decides to establish an S1-MME interface at an anchor eNB. After performing anchor selection algorithm, it is found that there are two candidate eNBs. While starting anchor activation procedure, the access eNB may request all the candidate eNBs simultaneously according to the results of the anchor selection algorithm. The access eNB may send Anchor Activation Request to both the anchor eNB 1 and the anchor eNB 2. The access eNB may receive more than one Anchor Activation Acks. In such a condition, the access eNB may decide which the anchor eNB (anchor eNB1 or anchor eNB2) should be chosen according to the scores calculated in the anchor selection procedure. After making the decision, the access eNB may send a Confirm message to the chosen anchor eNB (for example, to the anchor eNB 1) and send a Decline message to the other anchor eNBs that have sent the Anchor Activation Ack. After the anchor eNB1 successfully establishes the S1-MME interface for the UE, it may send Confirm Ack back to the access eNB for notification.

Figure 27:
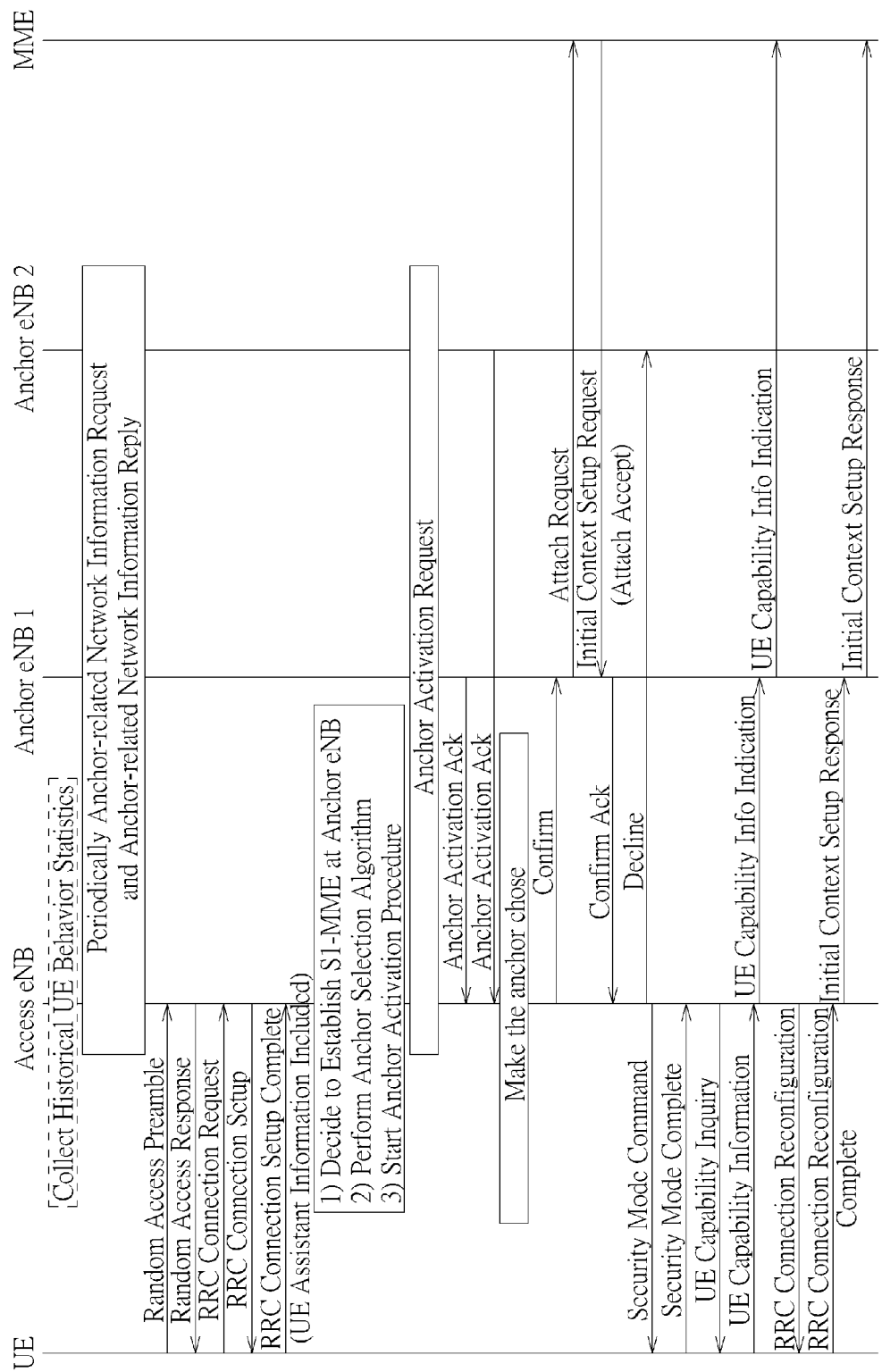

Please refer to FIG. 27, which illustrates a signaling diagram of the communication system according to an example of the present invention. In this example, the access eNB periodically gathers anchor-related network information and the UE provides UE assistant information. Through the anchor necessity decision procedure, the access eNB decides to establish an S1-MME interface at an anchor eNB. After performing anchor selection algorithm, it is found that there are two candidate eNBs. While starting anchor activation procedure, the access eNB may request all the candidate eNBs simultaneously according to the results of the anchor selection algorithm. The access eNB may send Anchor Activation Request to both the anchor eNB 1 and the anchor eNB 2. The access eNB may receive more than one Anchor Activation Acks. In such a condition, the access eNB may decide which the anchor eNB (anchor eNB1 or anchor eNB2) should be chosen according to the scores calculated in the anchor selection procedure. After making the decision, the access eNB may send a Confirm message to the chosen anchor eNB (for example, to the anchor eNB1). After the anchor eNB1 successfully establishes the S1-MME interface for the UE, it may send Confirm Ack back to the access eNB for notification. After receiving the Confirm Ack, the access eNB may then send a Decline message to other anchor eNBs that have sent the Anchor Activation Ack. This example can avoid the embarrassing situation where the access eNB may not get the Confirm Ack from the chosen anchor eNB (i.e., the anchor eNB1).

Figure 28:
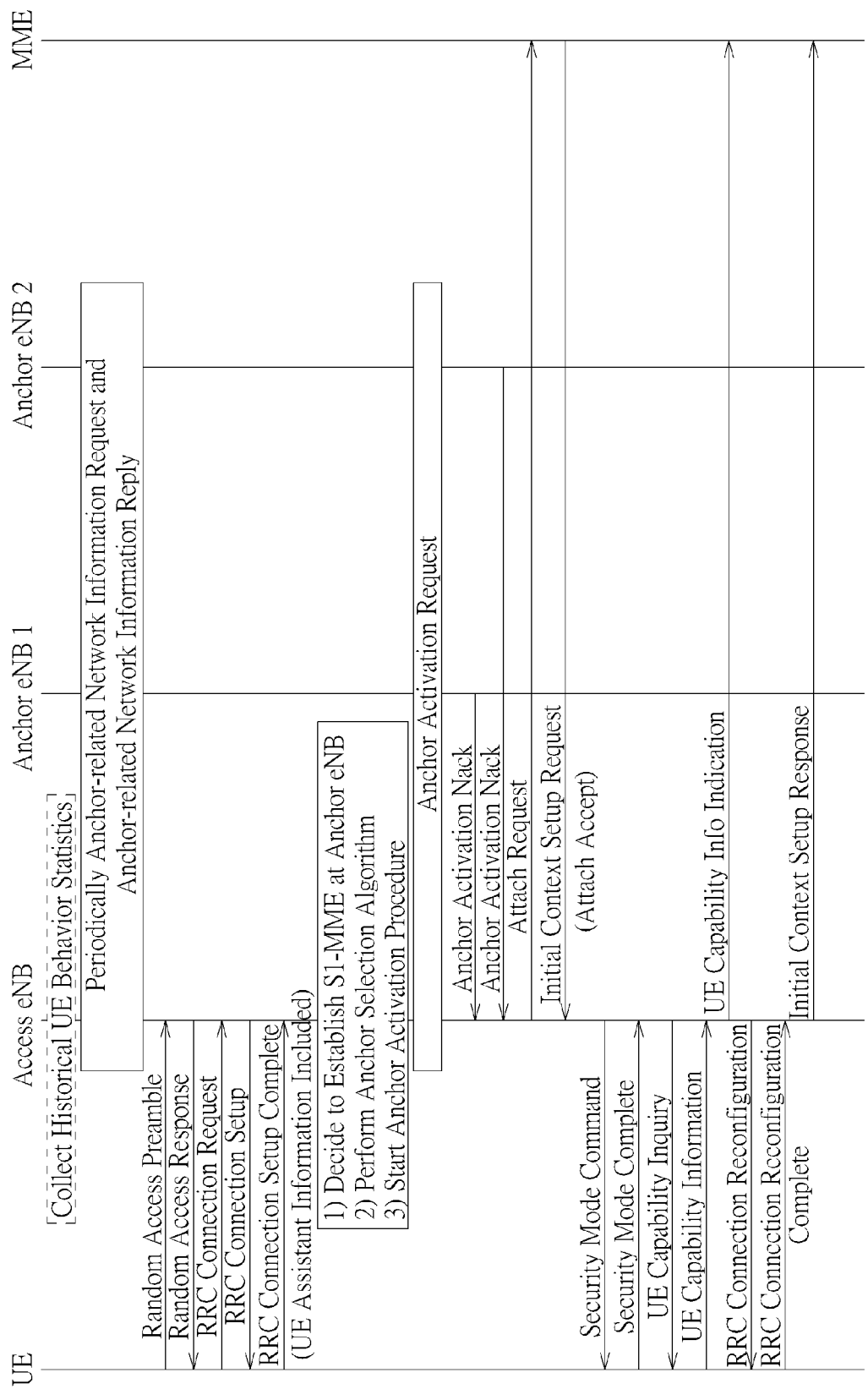

Please refer to FIG. 28, which illustrates a signaling diagram of the communication system according to an example of the present invention. In this example, the access eNB periodically gathers anchor-related network information and the UE provides UE assistant information. Through the anchor necessity decision procedure, the access eNB decides to establish an S1-MME interface at an anchor eNB. After performing anchor selection algorithm, it is found that there are two candidate eNBs. While starting anchor activation procedure, the access eNB may request all the candidate eNBs simultaneously according to the results of the anchor selection algorithm. The access eNB may send Anchor Activation Request to both the anchor eNB 1 and the anchor eNB 2. If the access eNB receives Anchor Activation Nack from all the candidate anchor eNBs, the access eNB has to establish the S1-MME interface for the UE at itself.

Figure 29:
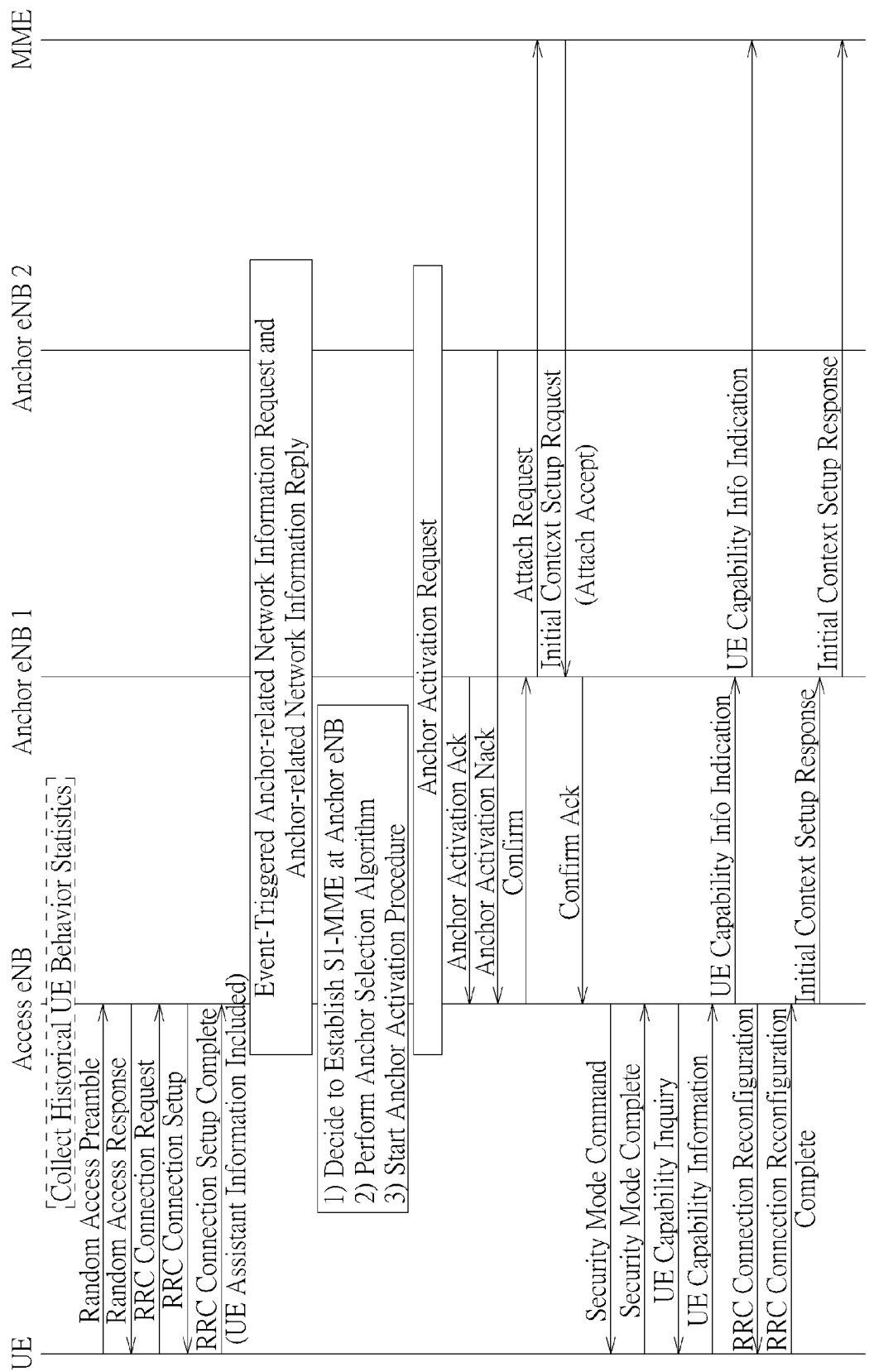

Please refer to FIG. 29, which illustrates a signaling diagram of the communication system according to an example of the present invention. In this example, the access eNB gathers anchor-related network information upon a triggering event and the UE provides UE assistant information. The access eNB may gather anchor-related network information before the anchor necessity decision procedure as shown in the example, or before performing the anchor selection algorithm while deciding to establish an S1-MME interface at an anchor eNB in an alternative way. After performing the anchor selection algorithm, it is found that there are two candidate eNBs.

While starting anchor activation procedure, the access eNB may request all the candidate eNBs simultaneously according to the results of the anchor selection algorithm. The access eNB may send Anchor Activation Request to both the anchor eNB 1 and the anchor eNB 2. If the access eNB receives only one Anchor Activation Ack (for example, from the anchor eNB 1) and receives Anchor Activation Nack from the others (or does not receive other Anchor Activation Ack in a period), the access eNB may send a Confirm message to the anchor eNB 1. After the anchor eNB 1 successfully establishes the S1-MME interface for the UE, it may send Confirm Ack back to the access eNB for notification.

Figure 30:
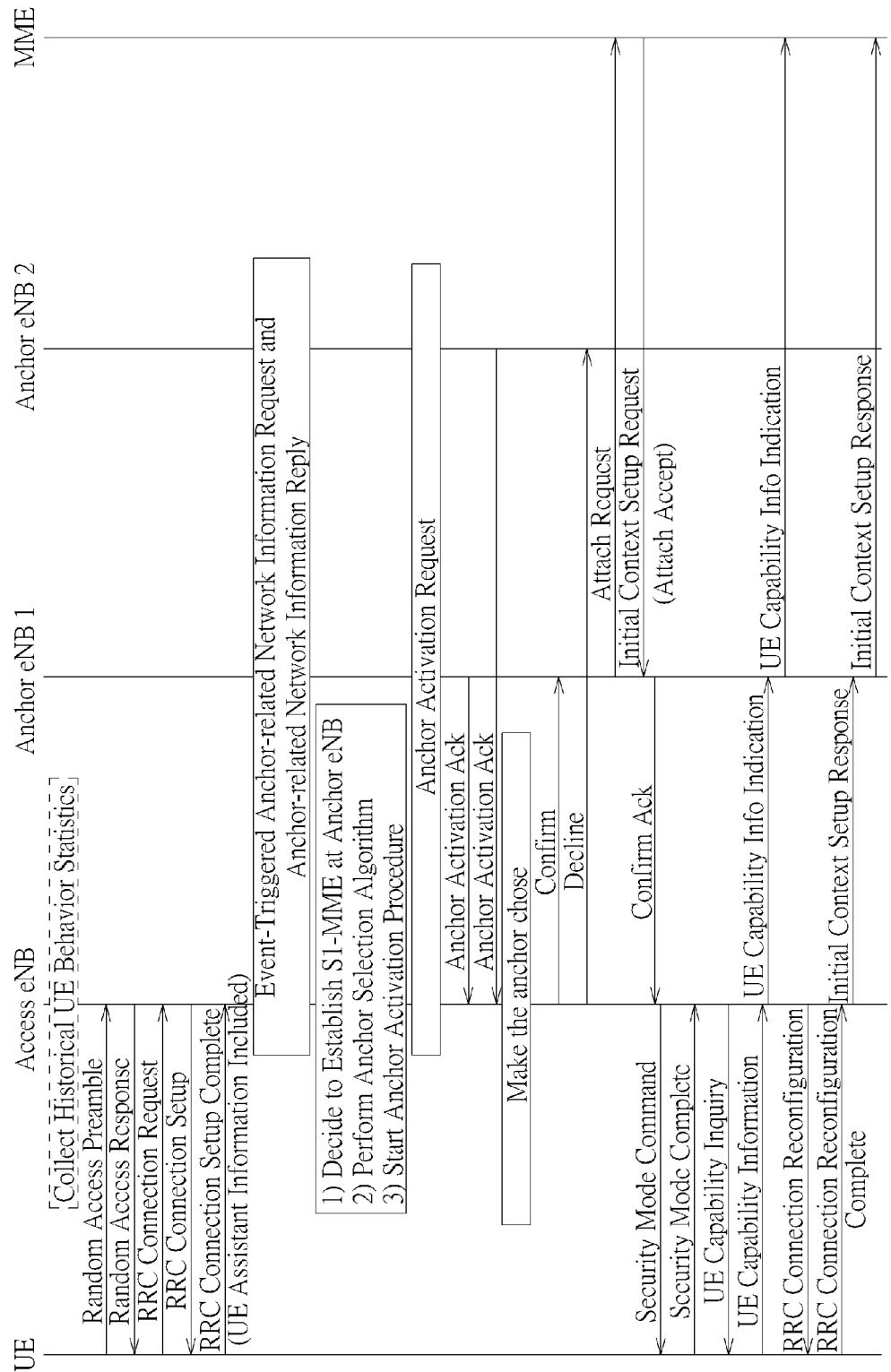

Please refer to FIG. 30, which illustrates a signaling diagram of the communication system according to an example of the present invention. In this example, the access eNB gathers anchor-related network information upon a triggering event and the UE provides UE assistant information. The access eNB may gather anchor-related network information before the anchor necessity decision procedure as shown in the example, or before performing the anchor selection algorithm while deciding to establish an S1-MME interface at an anchor eNB in an alternative way. After performing the anchor selection algorithm, it is found that there are two candidate eNBs.

While starting anchor activation procedure, the access eNB may request all the candidate eNBs simultaneously according to the results of the anchor selection algorithm. The access eNB may send Anchor Activation Request to both the anchor eNB 1 and the anchor eNB 2. If the access eNB receives more than one Anchor Activation Ack, the access eNB may decide which anchor eNB should be chosen for establishing the S1-MME interface according to the scores calculated in the anchor selection procedure. After making the decision, the access eNB may send a Confirm message to the chosen anchor eNB (for example, to the anchor eNB 1) and send a Decline message to other anchor eNBs that have sent the Anchor Activation Ack. After the anchor eNB 1 successfully establishes the S1-MME interface for the UE, it may send Confirm Ack back to the access eNB for notification.

Figure 31:
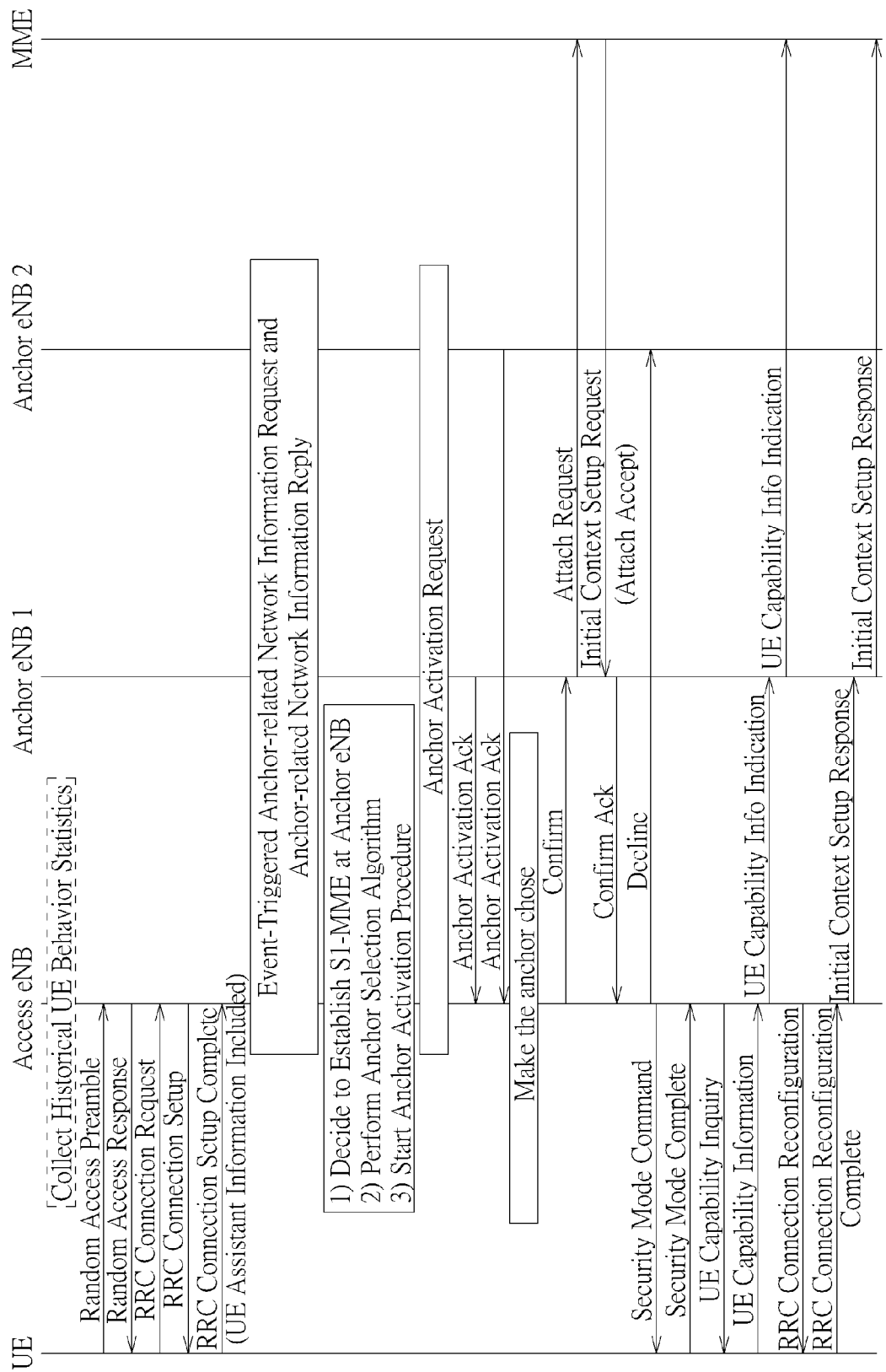

Please refer to FIG. 31, which illustrates a signaling diagram of the communication system according to an example of the present invention. In this example, the access eNB gathers anchor-related network information upon a triggering event and the UE provides UE assistant information. The access eNB may gather anchor-related network information before the anchor necessity decision procedure as shown in the example, or before performing the anchor selection algorithm while deciding to establish an S1-MME interface at an anchor eNB in an alternative way. After performing the anchor selection algorithm, it is found that there are two candidate eNBs.

While starting anchor activation procedure, the access eNB may request all the candidate eNBs simultaneously according to the results of the anchor selection algorithm. The access eNB may send Anchor Activation Request to both the anchor eNB 1 and the anchor eNB 2. If the access eNB receives more than one Anchor Activation Ack, the access eNB may decide which anchor eNB should be chosen for establishing the S1-MME interface according to the scores calculated in the anchor selection procedure. After making the decision, the access eNB may send a Confirm message to the chosen anchor eNB (for example, to the anchor eNB 1). After the anchor eNB 1 successfully establishes the S1-MME interface for the UE, it may send Confirm Ack back to the access eNB for notification. After receiving Confirm Ack, the access eNB may then send a Decline message to the other anchor eNBs that have sent the Anchor Activation Ack. This example can avoid the embarrassing situation where the access eNB may not get the Confirm Ack from the chosen anchor eNB (i.e., the anchor eNB1).

Figure 32:
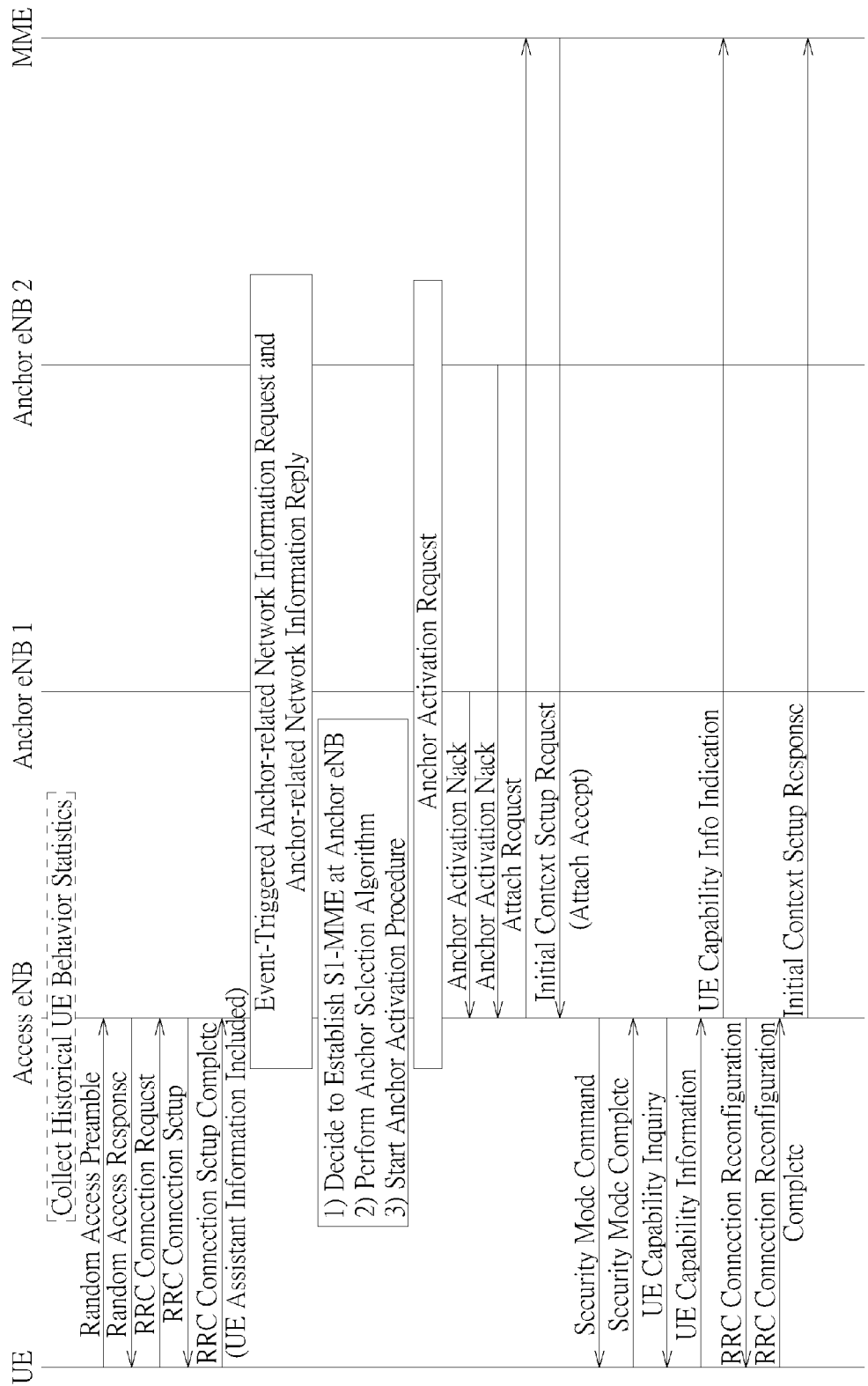

Please refer to FIG. 32, which illustrates a signaling diagram of the communication system according to an example of the present invention. In this example, the access eNB gathers anchor-related network information upon a triggering event and the UE provides UE assistant information. The access eNB may gather anchor-related network information before the anchor necessity decision procedure as shown in the example, or before performing the anchor selection algorithm while deciding to establish an S1-MME interface at an anchor eNB in an alternative way. After performing the anchor selection algorithm, it is found that there are two candidate eNBs.

While starting anchor activation procedure, the access eNB may request all the candidate eNBs simultaneously according to the results of the anchor selection algorithm. The access eNB may send Anchor Activation Request to both the anchor eNB 1 and the anchor eNB 2. If the access eNB receives Anchor Activation Nack from all its candidate anchor eNBs, the access eNB has to establish the S1-MME interface for the UE at itself.

In addition, while the load of an anchor eNB increases, the anchor eNB may send a Constraint Modification Command message with the modified anchor constraint(s) to all the affiliated eNBs served by it to adjust the corresponding threshold(s) and filter certain UEs, so as to avoid overload or request rejection. For example, if the load of an anchor eNB is heavy, the anchor eNB may send a message to all the eNBs serving by it to lower the corresponding threshold of TOS from 60s to 40s or lower the corresponding level of mobility state from medium to low.

Figure 33:
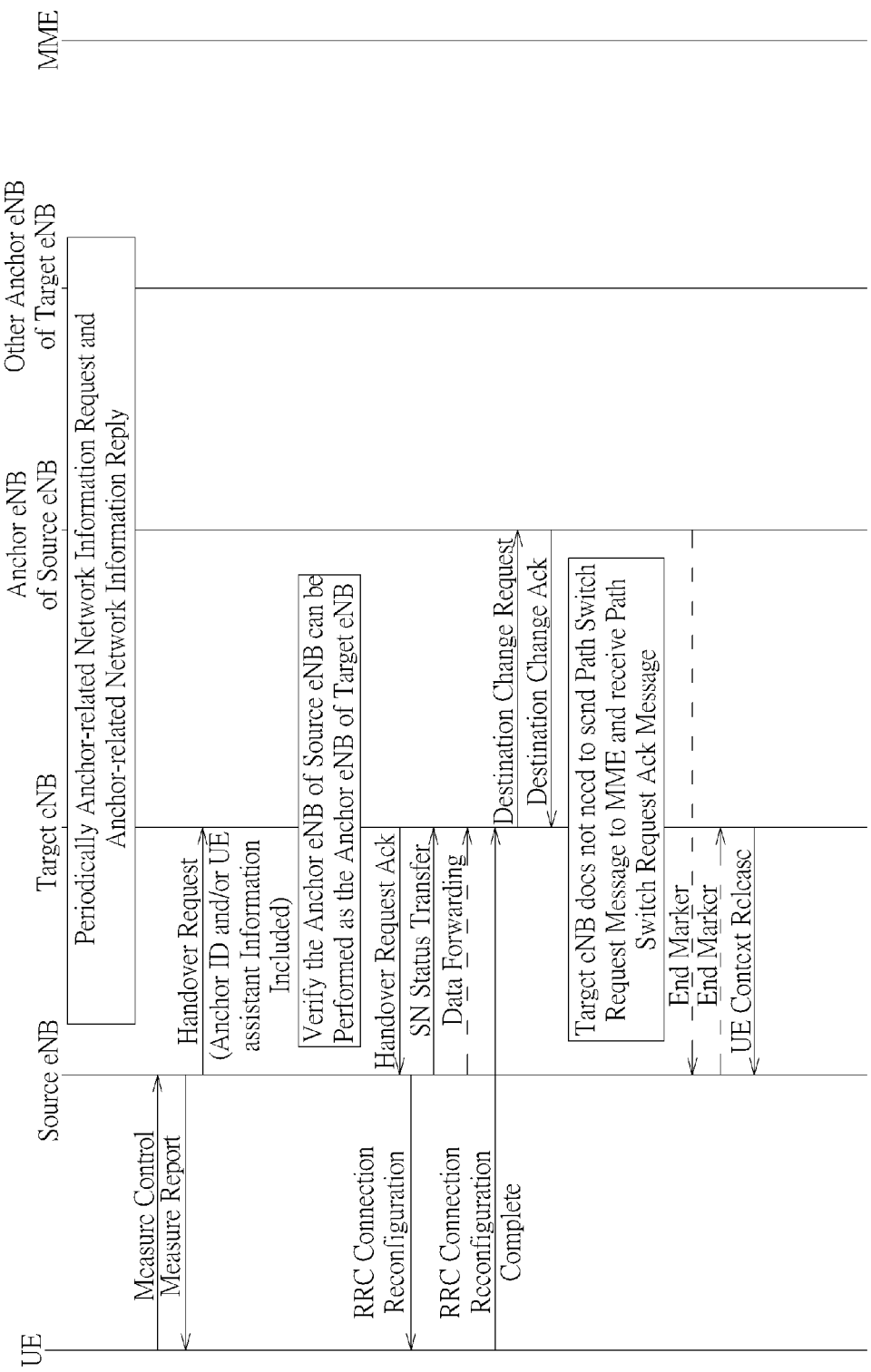

Please refer to FIG. 33, which illustrates a signaling diagram of the communication system according to an example of the present invention. This example shows the case that a target eNB is able to activate the anchor eNB of source eNB while handover. The source eNB may send Handover Request to the target eNB including the anchor ID (when the source eNB activates an anchor eNB) and/or UE assistant information. The target eNB may then verify whether the anchor eNB of the source eNB is able to serve for the UE if the UE hands over to the target eNB. If the anchor eNB of the source eNB is able to serve for the UE after the UE hands over to the target eNB, the target eNB may then send Destination Change Request to the same anchor eNB after sending Handover Request Ack to the source eNB. The anchor eNB of source eNB may then send Destination Change Ack back for response.

Figure 34:
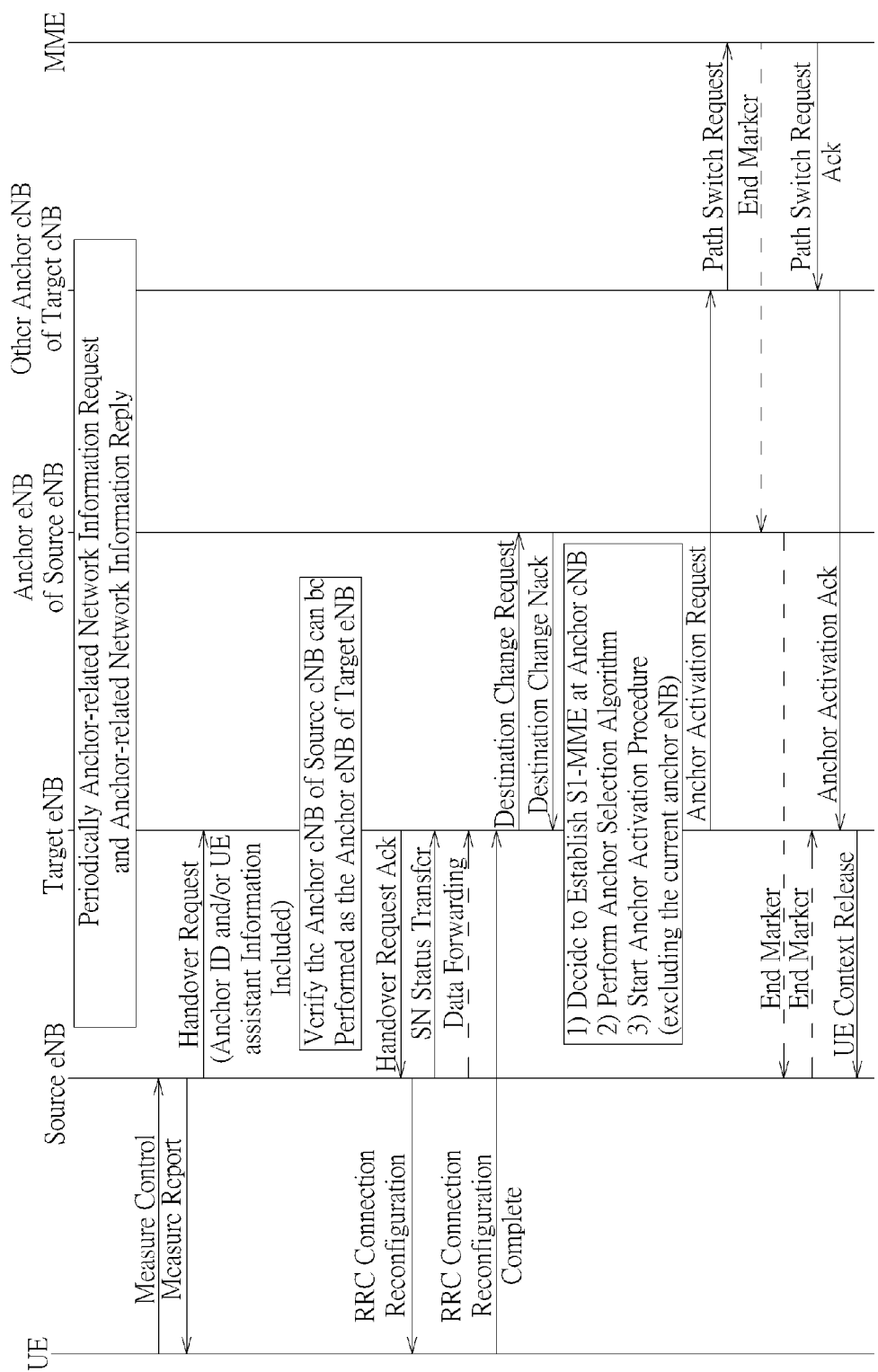

Please refer to FIG. 34, which illustrates a signaling diagram of the communication system according to an example of the present invention. This example shows the case that a target eNB is able to activate the anchor eNB of source eNB while handover. The source eNB may send Handover Request to the target eNB including the anchor ID (when the source eNB activates an anchor eNB) and/or UE assistant information. The target eNB may then verify whether the anchor eNB of the source eNB is able to serve for the UE camping on the target eNB. If the anchor eNB of the source eNB is able to serve for the UE camping on the target eNB, the target eNB may then send Destination Change Request to the same anchor eNB after sending Handover Request Ack to the source eNB. If the anchor eNB of source eNB sends Destination Change Nack back for response, the target eNB may perform the anchor necessity decision procedure. If the target eNB decides to establish an S1-MME interface at an anchor eNB for the UE, the target eNB may send Anchor Activation Request to its anchor eNBs (based on the results of the anchor selection algorithm). Then the anchor activation procedure may be executed by using one-by-one request or simultaneous requests as the aforementioned examples.

Figure 35:
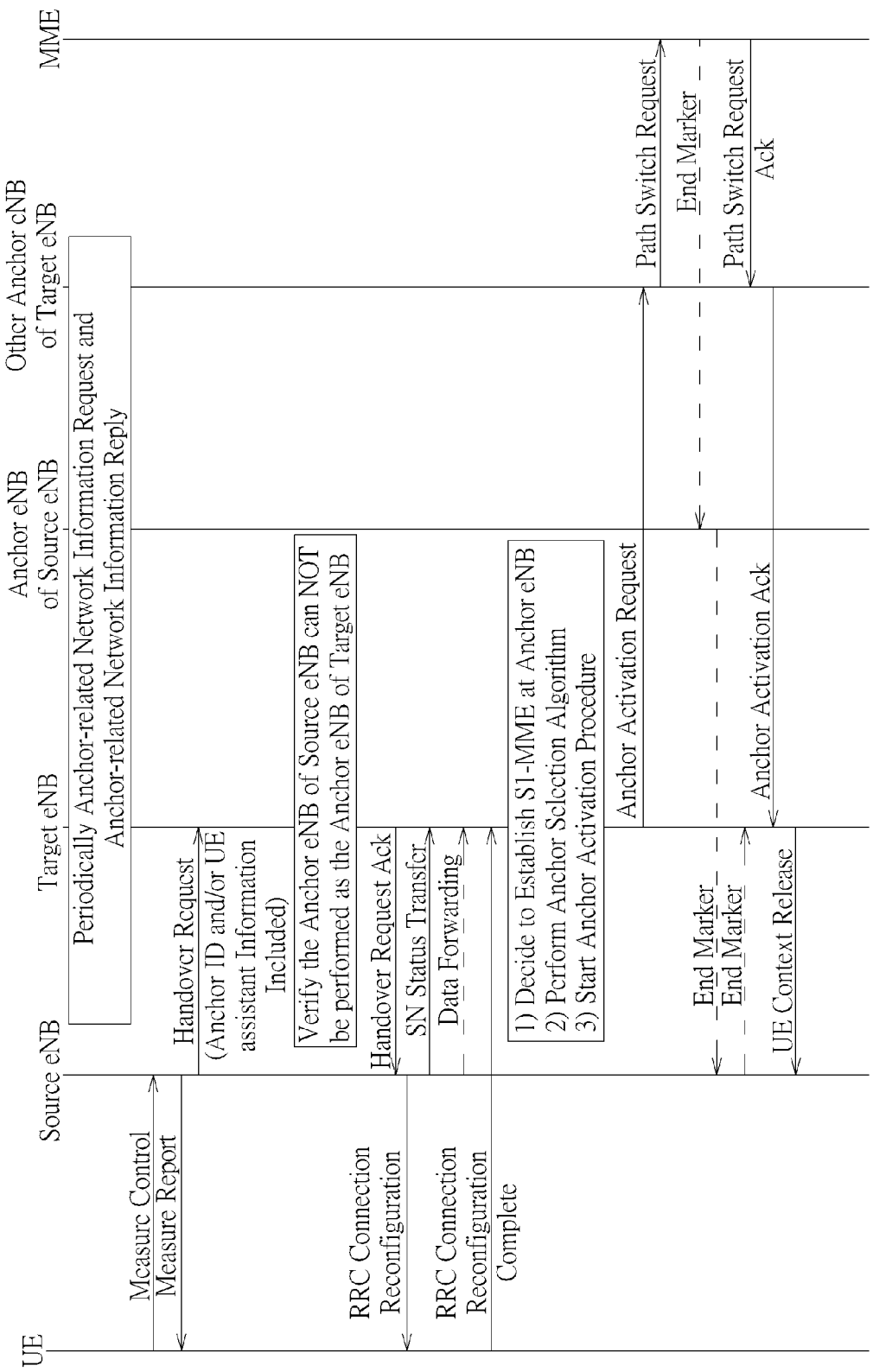

Please refer to FIG. 35, which illustrates a signaling diagram of the communication system according to an example of the present invention. This example shows the case that the target eNB is unable to activate the anchor eNB of source eNB while handover. The source eNB may send Handover Request to the target eNB including the anchor ID (when the source eNB activates an anchor eNB) and/or UE assistant information. The target eNB may then verify whether the anchor eNB of source eNB is able to serve for the UE camping on the target eNB. If the anchor eNB of source eNB is unable to serve for the UE camping on the target eNB, the target eNB may perform the anchor necessity decision procedure after sending Handover Request Ack to the source eNB. If the target eNB decides to establish an S1-MME interface at an anchor eNB for the UE, the target eNB may send Anchor Activation Request to its anchor eNBs (based on the results of the anchor selection algorithm). Then the anchor activation procedure may be executed by using one-by-one request or simultaneous requests as the aforementioned examples.

In an example, the target eNB may send an Assistant Information Request message to the UE to request for the UE assistant information. After receiving the UE assistant information from the UE, the target eNB may determine which eNB is selected to establish an S1-MME interface according to the UE assistant information, and select an anchor eNB if necessary. Then, the target eNB may send an Anchor Activation Request message to the selected anchor eNB. If the selected anchor eNB agrees with the request from the target eNB, it may send an Activation Request Ack message to the target eNB while receiving an Initial Context Setup request message from the MME; otherwise, the selected anchor eNB may send an Activation Request Nack message to the target eNB to deny the request.

Figure 36:
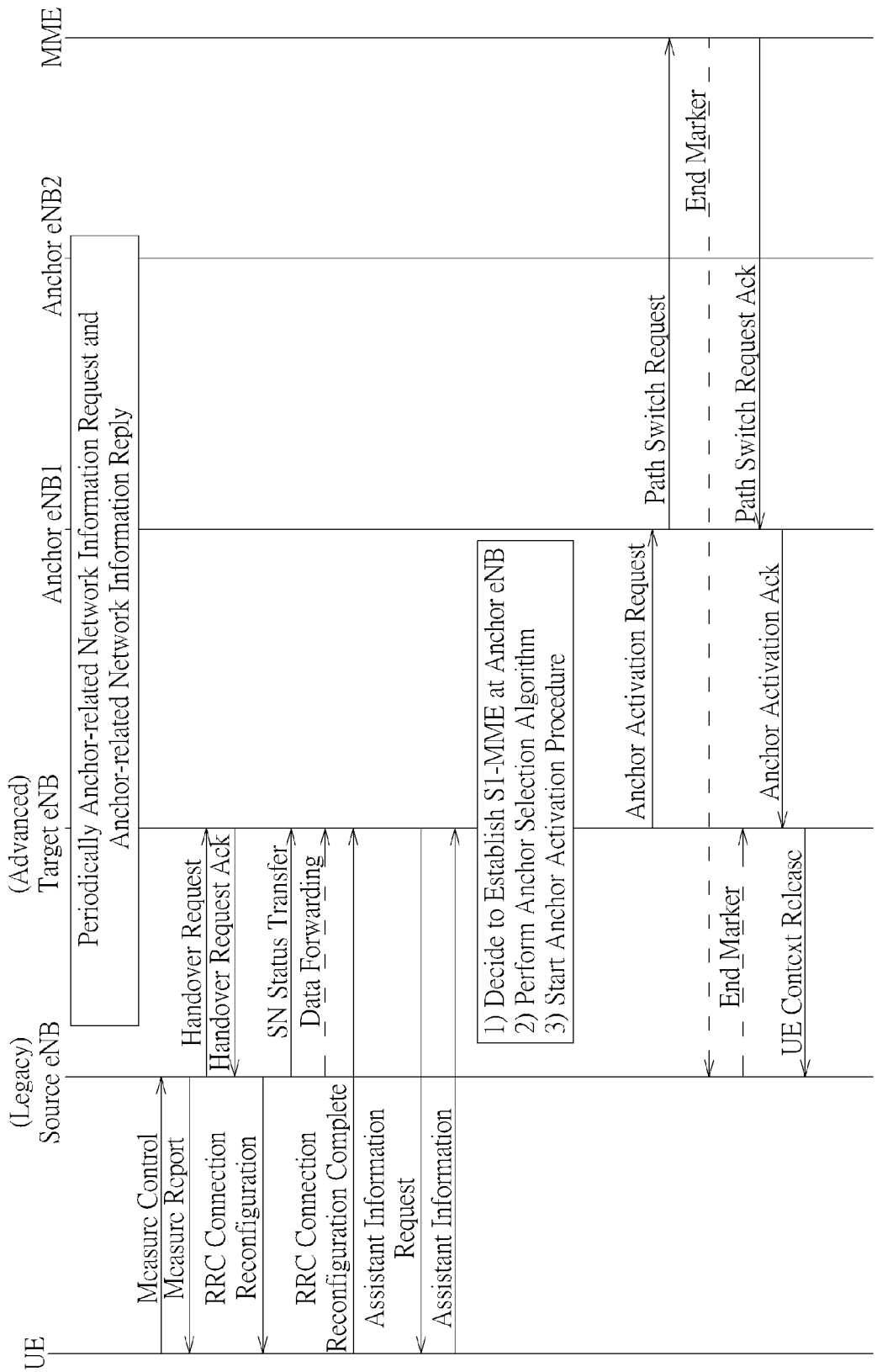

Please refer to FIG. 36, which illustrates a signaling diagram of the communication system according to an example of the present invention. In this example, the target eNB supports the anchor-based mobility management functionality but the source eNB does not support the anchor-based mobility management functionality (e.g., a legacy eNB). In other words, only the target eNB can perform the anchor activation procedure. Therefore, the target eNB may perform the anchor necessity decision procedure. If the target eNB decides to establish an S1-MME interface at an anchor eNB for the UE, the target eNB may send Anchor Activation Request to its anchor eNBs (based on the results of the anchor selection algorithm). Then the anchor activation procedure may be executed by using one-by-one request or simultaneous requests as the aforementioned examples.

Figure 37:
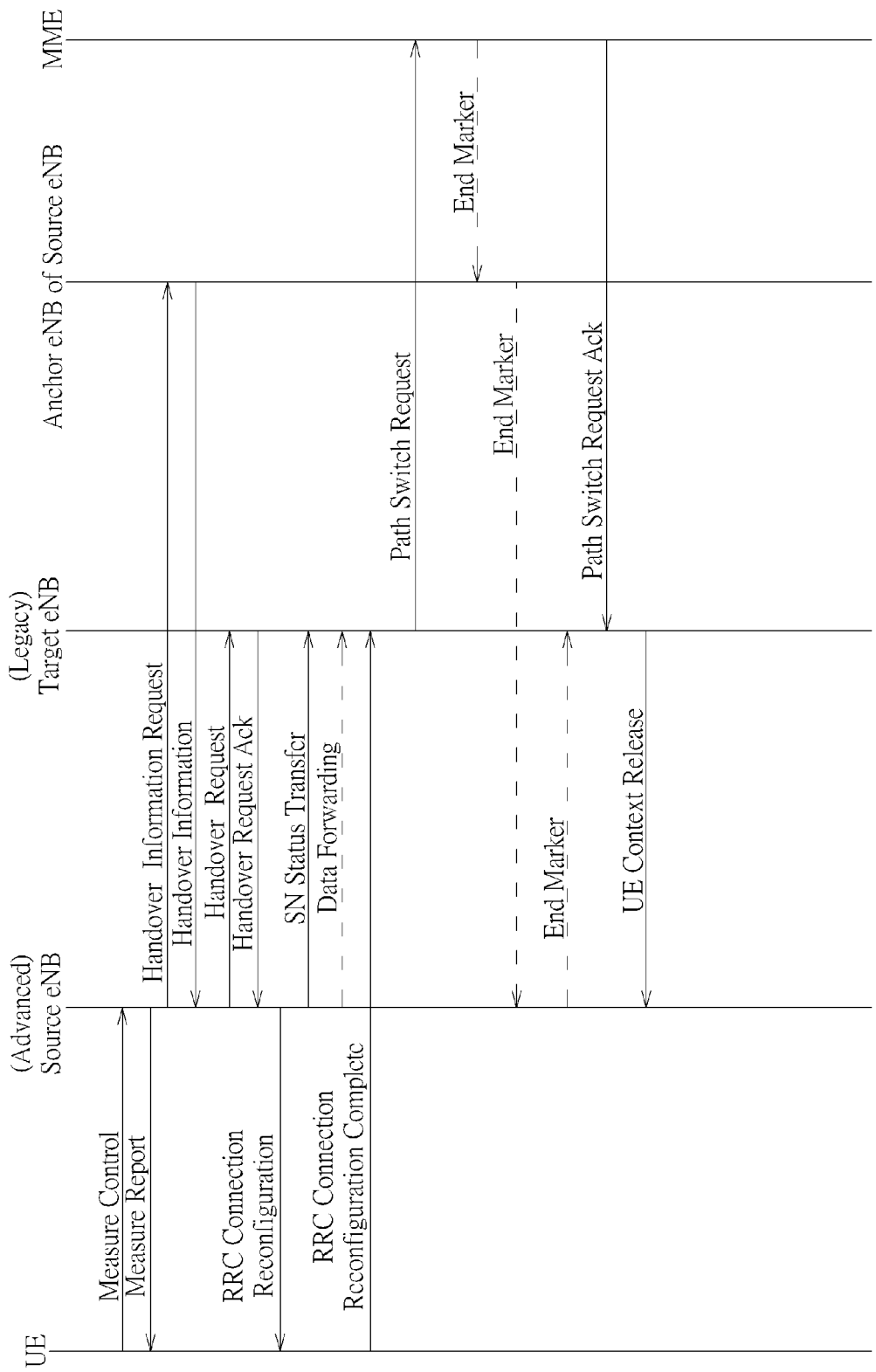

Please refer to FIG. 37, which illustrates a signaling diagram of the communication system according to an example of the present invention. In this example, the source eNB supports the anchor-based mobility management functionality but the target eNB does not support the anchor-based mobility management functionality (e.g., a legacy eNB). In other words, only the source eNB can perform the anchor activation procedure. Before sending Handover Request to the target eNB, the source eNB has to send Handover Information Request to the anchor eNB to ask for the handover information. After receiving Handover Information from the anchor eNB, the source eNB may use the information to generate the Handover Request. Then, the target eNB may send Path Switch Request to the MME. Afterward, the anchor eNB of source eNB may receive an End Marker and the End Marker may be forwarded to the source eNB to notify of the end of downlink data transmission.

Furthermore, while some conditions are satisfied, an anchor eNB may trigger a prohibit procedure. The condition may be that the load of the anchor eNB is above a pre-defined threshold or the cost of being an anchor of an eNB is higher than a threshold. In the prohibit procedure, the anchor eNB may choose one or more victim access eNBs and prohibit them from sending the anchor activation request based on the mobility statistics recorded by the anchor eNB in the past. The mobility statistics may be the average TOS of an access eNB or average number of handovers ($N_{HO}$) of a UE starting from the access eNB.

Figure 38:
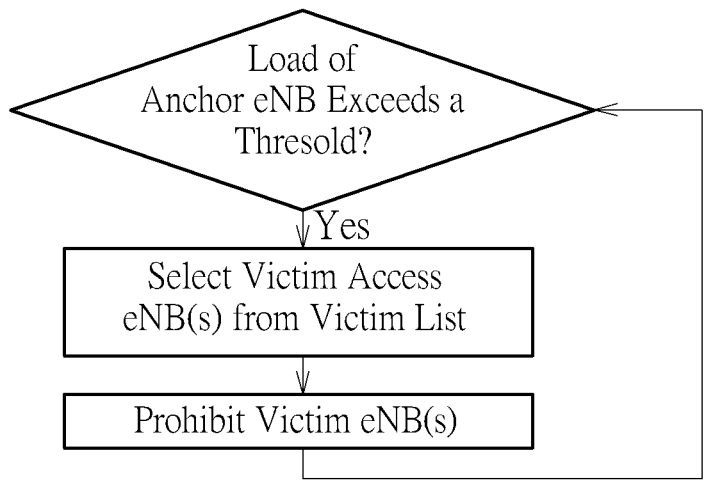
FIG. 38 is a flow chart of a prohibit procedure according to an example of the present invention.
Figure 39:
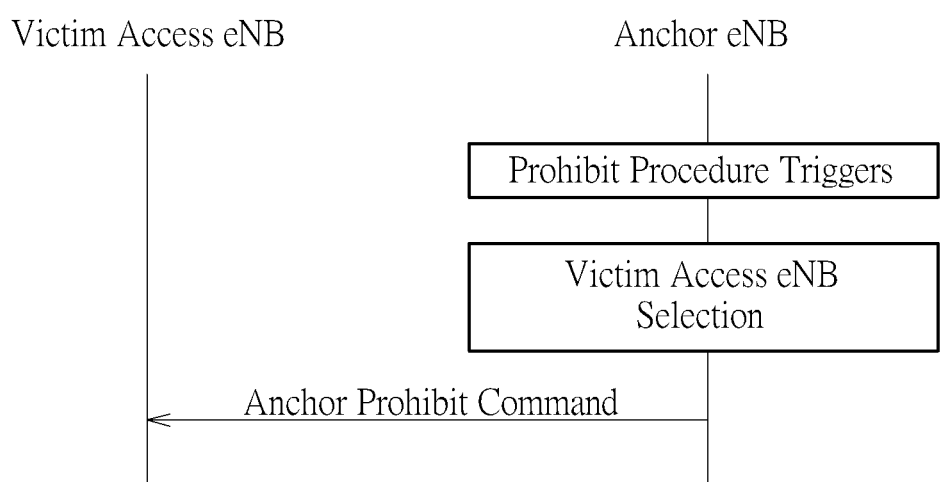
FIG. 39 is a signal diagram of a prohibit procedure according to an example of the present invention.
Figure 40:
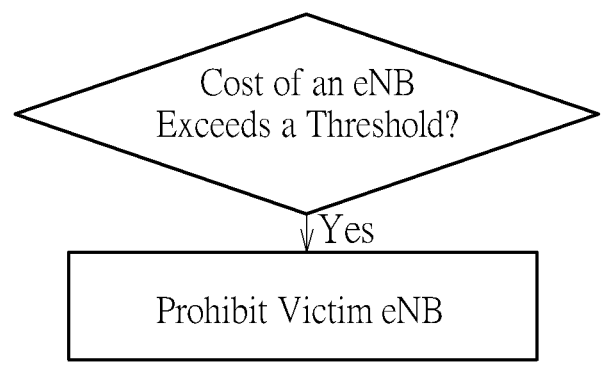
FIG. 40 is a flow chart of a prohibit procedure according to an example of the present invention.
Figure 41:
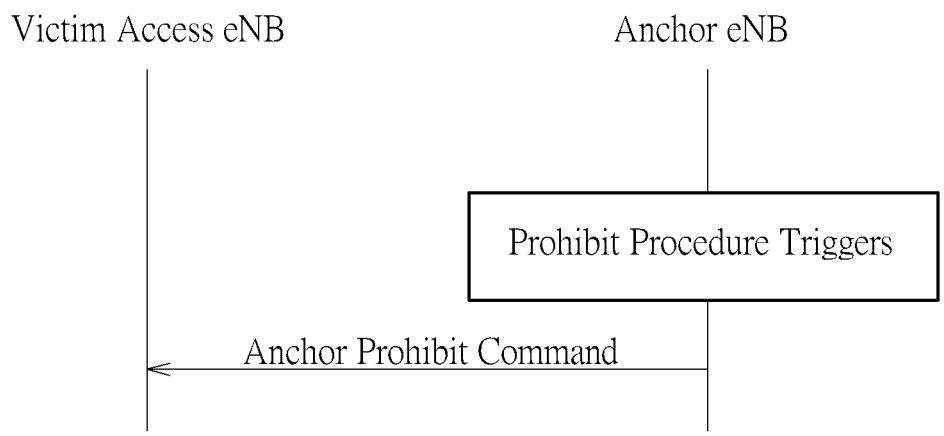
FIG. 41 is a signal diagram of a prohibit procedure according to an example of the present invention.

If the cause of prohibit procedure is related to the load of anchor eNB (e.g., the load of the anchor eNB is larger than 85%), the anchor eNB may trigger a victim access eNB selection procedure to select one or more victim access eNBs (as shown in FIGS. 38 and 39). If the case of prohibit procedure is related to the behavior or characteristics of a specific eNB (e.g., the average number of handovers of a UE starting from the specific eNB is smaller than 1.2, or the average TOS of the specific eNB is larger than 100), this specific eNB may be selected as the victim access eNB (as shown in FIGS. 40 and 41). Then, the anchor eNB may send Anchor Prohibit Command to the selected victim access eNB(s). Once receiving the Anchor Prohibit Command from an anchor eNB, the victim access eNB is prohibited from asking this anchor eNB to establish an S1-MME interface for a UE. A prohibit timer may be included in the Anchor Prohibit Command, which indicates that the victim access eNB can only select the anchor eNB after the prohibit timer is expired.

A score function may be defined to calculate the score of each access eNB with multiple measures (e.g., TOS, $N_{HO}$, Load, etc.) For example, the score function may be defined as follows.

$$\text{score} = \text{TOS}/N_{HO} \quad (1)$$

Suppose an anchor eNB A1 can be the anchor eNB of five access eNBs C1, C2, C3, C4 and C5, and the TOS, $N_{HO}$, and the calculated scores of the access eNBs C1, C2, C3, C4 and C5) are shown in TABLE I.

TABLE I

|  | TOS | $N_{HO}$ | Score as calculated by Eq. (1) |
| --- | --- | --- | --- |
| Access eNB C1 | 30 | 2 | 0.067 |
| Access eNB C2 | 20 | 3 | 0.15 |
| Access eNB C3 | 15 | 2.5 | 0.167 |
| Access eNB C4 | 20 | 2.5 | 0.125 |
| Access eNB C5 | 35 | 1.5 | 0.043 |

According to TABLE I, the victim list contains the access eNBs in an order of C5, C1, C4, C2, C3. In this example, when the anchor eNB A1 is overloaded, the access eNB C5 will be the first one to be prohibited since the score of the access eNB C5 is the lowest among all the access eNBs associated with the anchor eNB A1. Further, when a parameter of an access eNB is below a predefined threshold, the anchor eNB A1 may also prohibit this access eNB. For example, if $N_{HO}$ must exceed 1.8, the access eNB C5 will be prohibited from asking the anchor eNB A1 to be the anchor eNB for a UE. Note that equation (1) is just an example of the score function. Other factors or weightings, for example, may also be included in a score function.

The present invention may be used in scenarios where macro and small cells on the same carrier frequency (intra-frequency) are connected via non-ideal backhaul, macro and small cells on different carrier frequencies (inter-frequency) are connected via non-ideal backhaul, or only small cells on one or more carrier frequencies are connected via non-ideal backhaul.

The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

In summary, the present invention provides methods and steps for handling anchor-based mobility management. An access eNB may determine whether to establish an S1 interface between an anchor eNB and MME according to UE-related information. If there are multiple candidate anchor eNBs, the access eNB may further determine which anchor eNB should be the anchor eNB for establishing the S1-MME interface according to anchor-related network information and/or UE-related information. As such, the communication system of the present invention can intelligently select a suitable anchor eNB as its S1-MME interface so as to effectively save control signalling towards core network per cell re-selection (or handover) while preventing reliability issues (e.g. the services of affiliated eNBs terminate due to the anchor eNB crash.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling anchor-based mobility management in a communication system, the method comprising:
   an access base station of a user equipment (UE) determining whether to establish an interface to a mobility management entity (MME) at an anchor base station for the UE;
   the access base station selecting at least one anchor base station for establishing the interface; and
   the access base station requesting the at least one anchor base station to establish the interface for the UE.

2. The method of claim 1, wherein whether to establish the interface to the MME at an anchor base station for the UE is determined according to UE-related information.

3. The method of claim 2, further comprising:
   collecting the UE-related information from the UE or deriving the UE-related information from historical statistics of one or more UEs which have been connected to the access base station.

4. The method of claim 2, wherein the UE-related information comprises at least one of mobility information, traffic information, and UE requirement information.

5. The method of claim 4, wherein the mobility information comprises at least one of an average time of stay in a cell, a mobility state, and a moving trajectory of one or more UEs.

6. The method of claim 4, wherein the traffic information comprises at least one of the number of transitions from an IDLE mode to a Connected mode, from a Connected mode to an IDLE mode, or both in a pre-defined period and a traffic type of one or more UEs.

7. The method of claim 4, wherein the UE requirement information comprises at least one of an elapsed time tolerance and a delay tolerance of one or more UEs.

8. The method of claim 1, wherein the at least one anchor base station is selected for establishing the interface according to at least one of anchor-related network information and UE-related information.

9. The method of claim 8, wherein the step of selecting at least one anchor base station for establishing the interface comprises:
   calculating a score of each candidate anchor base station based on the at least one of anchor-related network information and UE-related information; and
   selecting one or more anchor base stations with scores higher than a pre-defined threshold or with the highest rankings in score as the at least one anchor base station for establishing the interface.

10. The method of claim 8, further comprising:
    receiving the anchor-related network information from candidate anchor base stations or neighboring base stations periodically.

11. The method of claim 8, further comprising:
    sending anchor information requests to candidate anchor base stations or neighboring base stations upon a triggering event to request the anchor-related network information; and
    receiving the anchor-related network information from the candidate anchor base stations or the neighboring base stations.

12. The method of claim 8, wherein the anchor-related network information comprises at least one of an anchor identity, load information, and anchor constraints.

13. The method of claim 12, wherein the anchor identity is represented by evolved NodeB Identifier.

14. The method of claim 12, wherein the anchor constraint is a pre-defined threshold for the UE-related information.

15. The method of claim 14, wherein the anchor base station sends a constraint modification message to modify the threshold for the UE-related information.

16. The method of claim 1, wherein the access base station determines whether to establish the interface at an anchor base station for the UE when the UE transits from an IDLE mode to a Connected mode or during a handover procedure of the UE.

17. The method of claim 16, wherein the access base station is a target base station of the handover procedure.

18. The method of claim 16, wherein the access base station is a serving base station to which the UE is connected during a time when the UE transits from an IDLE mode to a Connected mode.

19. The method of claim 1, wherein the interface is an S1-MME interface.

20. The method of claim 1, further comprising:
    the access base station receiving an acknowledgment message from a first anchor base station of the at least one anchor base station after requesting the first anchor base station to establish the interface for the UE;
    wherein the acknowledgment message indicates a success of establishing the interface to the MME at the first anchor base station.

21. The method of claim 20, wherein the access base station requests another anchor base station of the at least one anchor base station if receiving a non-acknowledgment message from a second anchor base station of the at least one anchor base station after requesting the second anchor base station of the at least one anchor base station to establish the interface for the UE.

22. The method of claim 1, further comprising:
    the access base station choosing a third anchor base station of the at least one anchor base station to establish the interface to the MME by sending a Confirm message to the third anchor base station if receiving multiple acknowledgment messages from the at least one anchor base station after requesting the at least one anchor base station to establish the interface for the UE.

23. The method of claim 22, wherein the third anchor base station establishes the interface to the MME for the UE after receiving the Confirm message from the access base station.

24. The method of claim 1, further comprising:
    the access base station establishing the interface to the MME at itself if receiving non-acknowledgment messages from all of the at least one anchor base station after requesting the at least one anchor base station to establish the interface for the UE.

25. The method of claim 1, further comprising:
    verifying whether a current anchor base station is able to establish the interface for the UE if the UE hands over to the access base station before determining whether to establish the interface to the MME at an anchor base station for the UE; and
    informing the current anchor base station to change a destination path to the access base station if the current anchor base station is able to establish the interface for the UE if the UE hands over to the access base station.

26. The method of claim 1, further comprising:
    receiving an anchor prohibit command, whereby the access base station stops sending an anchor activation request to the anchor base station.

27. The method of claim 26, further comprising:
being selected as a victim access base station before the access base station receives the anchor prohibit command, wherein a load of the anchor base station or a cost of being the anchor base station of the access base station based on mobility statistics is over a pre-defined threshold.

28. The method of claim 27, wherein the mobility statistics is the average time of stay (TOS) or average number of handovers ($N_{HO}$) for user equipments (UEs) starting from an access base station.

* * * * *